(12) United States Patent
Lee et al.

(10) Patent No.: US 10,096,303 B2
(45) Date of Patent: Oct. 9, 2018

(54) HOST AND MULTI-DISPLAY SYSTEM INCLUDING THE SAME

(71) Applicants: Byung Tak Lee, Yongin-si (KR); Kyoung Man Kim, Suwon-si (KR); Jong Ho Roh, Yongin-si (KR)

(72) Inventors: Byung Tak Lee, Yongin-si (KR); Kyoung Man Kim, Suwon-si (KR); Jong Ho Roh, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 188 days.

(21) Appl. No.: 14/713,080

(22) Filed: May 15, 2015

(65) Prior Publication Data
US 2016/0055830 A1 Feb. 25, 2016

(30) Foreign Application Priority Data
Aug. 25, 2014 (KR) .................. 10-2014-0110905

(51) Int. Cl.
G09G 5/00 (2006.01)
G09G 5/18 (2006.01)
G06F 3/14 (2006.01)

(52) U.S. Cl.
CPC ............. *G09G 5/18* (2013.01); *G06F 3/1446* (2013.01); *G09G 5/006* (2013.01); *G09G 2340/0435* (2013.01); *G09G 2370/042* (2013.01)

(58) Field of Classification Search
CPC ...... G06F 17/28; G06F 19/20; G06F 11/3027; G06F 11/3051; G06F 13/364
See application file for complete search history.

(56) References Cited

U.S. PATENT DOCUMENTS

| | | | |
|---|---|---|---|
| 6,956,579 B1* | 10/2005 | Diard ................. | G06F 12/0284 345/502 |
| 7,995,003 B1* | 8/2011 | Diard .................... | G06F 3/1438 345/1.1 |
| 8,184,114 B2 | 5/2012 | Oh et al. | |
| 8,537,166 B1* | 9/2013 | Diard ....................... | G06T 1/20 345/1.3 |
| 8,704,732 B2 | 4/2014 | Pourbigharaz et al. | |
| 2001/0013904 A1 | 8/2001 | Kubota et al. | |

(Continued)

FOREIGN PATENT DOCUMENTS

| | | |
|---|---|---|
| JP | 2000163036 | 6/2000 |
| JP | 2000242246 | 9/2000 |

(Continued)

*Primary Examiner* — Olga Merkoulova
(74) *Attorney, Agent, or Firm* — Volentine, Whitt & Francos, PLLC

(57) ABSTRACT

A system on chip (SoC) for transmitting data packets to a display driver integrated circuit (IC) controlling a plurality of displays is provided. The SoC includes a first register, and a central processing unit (CPU) configured to set first values in the first register to adjust a frame rate of each of the displays. A tearing effect (TE) signal detection circuit is configured to detect a TE signal output from the display driver IC. A data transmission circuit is configured to generate a plurality of frame rate adjustment signals using the detected TE signal and the first values and to control transmission timings of the data packets transmitted to the displays using the frame rate adjustment signals.

20 Claims, 22 Drawing Sheets

(56) References Cited

U.S. PATENT DOCUMENTS

| | | |
|---|---|---|
| 2009/0147130 A1 | 6/2009 | Kim |
| 2013/0044089 A1* | 2/2013 | Chang-Chian ........ G06F 3/1431 |
| | | 345/204 |
| 2015/0015591 A1* | 1/2015 | Oh ........................... G06F 3/14 |
| | | 345/519 |

FOREIGN PATENT DOCUMENTS

| | | |
|---|---|---|
| JP | 2013088629 | 5/2013 |
| KR | 20060092524 A | 8/2006 |
| KR | 20080087572 A | 10/2008 |
| KR | 20120074517 A | 7/2012 |

* cited by examiner

HOST AND MULTI-DISPLAY SYSTEM INCLUDING THE SAME

CROSS-REFERENCE TO RELATED APPLICATIONS

This application claims priority under 35 U.S.C. § 119(a) from Korean Patent Application No. 10-2014-0110905 filed on Aug. 25, 2014, the disclosure of which is hereby incorporated by reference in its entirety.

BACKGROUND

Embodiments of the inventive concept relate to a semiconductor device, and more particularly, to a multi-display system with low power consumption and small hardware layout area.

In a multi-display system including N displays (where N is a natural number of at least 2), display data is transmitted to N display controllers through N physical channels connected between a host and the N display controllers and the N display controllers transmit the display data to N displays. The host needs to have N transmitters to transmit the display data to the N physical channels. Such a multi-display system requires a large amount of computation and a large hardware layout area and is thus may not be suitable to a mobile device requiring low power consumption and small hardware layout area.

SUMMARY

Some embodiments of the inventive concept provide a multi-display system with low power consumption and small hardware layout area.

According to some embodiments of the inventive concept, there is provided a system on chip (SoC) for transmitting data packets to a display driver integrated circuit (IC) controlling a plurality of displays. The SoC includes a first register, a central processing unit (CPU) configured to set first values in the first register to adjust a frame rate of each of the displays, a tearing effect (TE) signal detection circuit configured to detect a TE signal output from the display driver IC, and a data transmission circuit configured to generate a plurality of frame rate adjustment signals using the detected TE signal and the first values and to control transmission timings of the data packets transmitted to the displays using the frame rate adjustment signals.

The data transmission circuit may sequentially transmit transmission timing-controlled data packets to the display driver IC through a single high-speed serial interface (HSSI). The HSSI may be a display serial interface (DSI), an embedded DisplayPort (eDP) interface, or a high definition multimedia interface (HDMI).

The data transmission circuit may sequentially transmit the transmission timing-controlled data packets to the display driver IC in frame units. Alternatively, the data transmission circuit may sequentially transmit the transmission timing-controlled data packets to the display driver IC in line units.

The data transmission circuit may generate the data packets each of which includes an identifier for identifying one of the displays. The identifier may include a virtual channel identifier and a data type. Not all but at least one of the first values may be 0.

The SoC may further include a second register configured to store second values set by the CPU. The data transmission circuit may include a plurality of transmission control circuits configured to control transmission of the detected TE signal in response to the second values, respectively; and a plurality of frame rate adjustment signal generation circuits configured to respectively generate the frame rate adjustment signals using output signals of the respective transmission control circuits and the first values, respectively. The CPU may set the first values in the first register and the second values in the second register when booted.

Alternatively, the SoC may further include a second register configured to store second values set by the CPU. At this time, the data transmission circuit may include a display controller configured to generate the frame rate adjustment signals using the detected TE signal, the first values, and the second values and to adjust transmission timings of data to be displayed on the displays using the frame rate adjustment signals. A data packetizing circuit is configured to generate the data packets, each of which includes transmission timing-controlled data to be displayed on one of the displays and an identifier for identifying the one of the displays. A transmitter is configured to sequentially transmit the data packets from the data packetizing circuit to the display driver IC. The identifier may include a virtual channel identifier and a data type.

The data packetizing circuit may be a mobile industry processor interface (MIPI) display serial interface (DSI) host and the transmitter may be a MIPI D-PHY.

According to other embodiments of the inventive concept, there is provided a multi-display system including a display driver IC configured to control operations of a plurality of displays, a high-speed serial interface, and a processor configured to sequentially transmit data packets to the display driver IC through the high-speed serial interface.

The processor may include a first register, a CPU configured to set first values in the first register to adjust a frame rate of each of the displays, a TE signal detection circuit configured to detect a TE signal output from the display driver IC, and a data transmission circuit configured to generate a plurality of frame rate adjustment signals using the detected TE signal and the first values and to control transmission timings of the data packets transmitted to the displays using the frame rate adjustment signals. The high-speed serial interface may be a MIPI DSI, an eDP interface, or an HDMI.

The data transmission circuit may generate the data packets each of which includes an identifier for identifying one of the displays. The identifier may include a virtual channel identifier and a data type.

The display driver IC may decode a first identifier included in a first data packet among the data packets received through the high-speed serial interface, identify one of the displays according to decoding result, and transmit first data included in the first data packet to the identified display.

According to still other embodiments of the inventive concept, there is provided a multi-display system including a display driver IC configured to control operations of a plurality of displays and a processor configured to sequentially transmit data packets to the display driver IC through a high-speed serial interface.

The display driver IC may decode a first identifier included in a first data packet among the data packets received through the high-speed serial interface, identify one of the displays according to decoding result, and transmit first data included in the first data packet to the identified display. The first identifier may include a virtual channel identifier and a data type.

According to even other embodiments of the inventive concept, there is provided an SoC for transmitting data packets to a plurality of display driver ICs respectively controlling a plurality of displays. The SoC includes: a first register configured to store first values for adjusting a frame rate; a second register configured to store second values for generating selection signals; a TE signal detection circuit configured to detect TE signals respectively output from the display driver ICs; and a data transmission circuit configured to select at least one among the detected TE signals using the second values, to generate a plurality of frame rate adjustment signals using the at least one selected TE signal and the first values, and to control transmission timings of the data packets transmitted to the displays using the frame rate adjustment signals.

According to yet other embodiments of the inventive concept, there is provided a multi-display system including a plurality of display driver ICs configured to control operations of a plurality of displays, a plurality of high-speed serial interfaces, and a processor configured to transmit data packets to the display driver ICs through the high-speed serial interfaces. The processor includes: a first register configured to store first values for adjusting a frame rate; a second register configured to store second values for generating selection signals; a TE signal detection circuit configured to detect TE signals respectively output from the display driver ICs; and a data transmission circuit configured to select at least one among the detected TE signals using the second values, to generate a plurality of frame rate adjustment signals using the at least one selected TE signal and the first values, and to control transmission timings of the data packets transmitted to the displays using the frame rate adjustment signals.

Among the display driver ICs, a first display driver IC may decode a first identifier included in a first data packet among the data packets received through one of the high-speed serial interfaces and may transmit first data included in the first data packet to a first display connected to the first display driver IC according to decoding result.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

Figure 1:
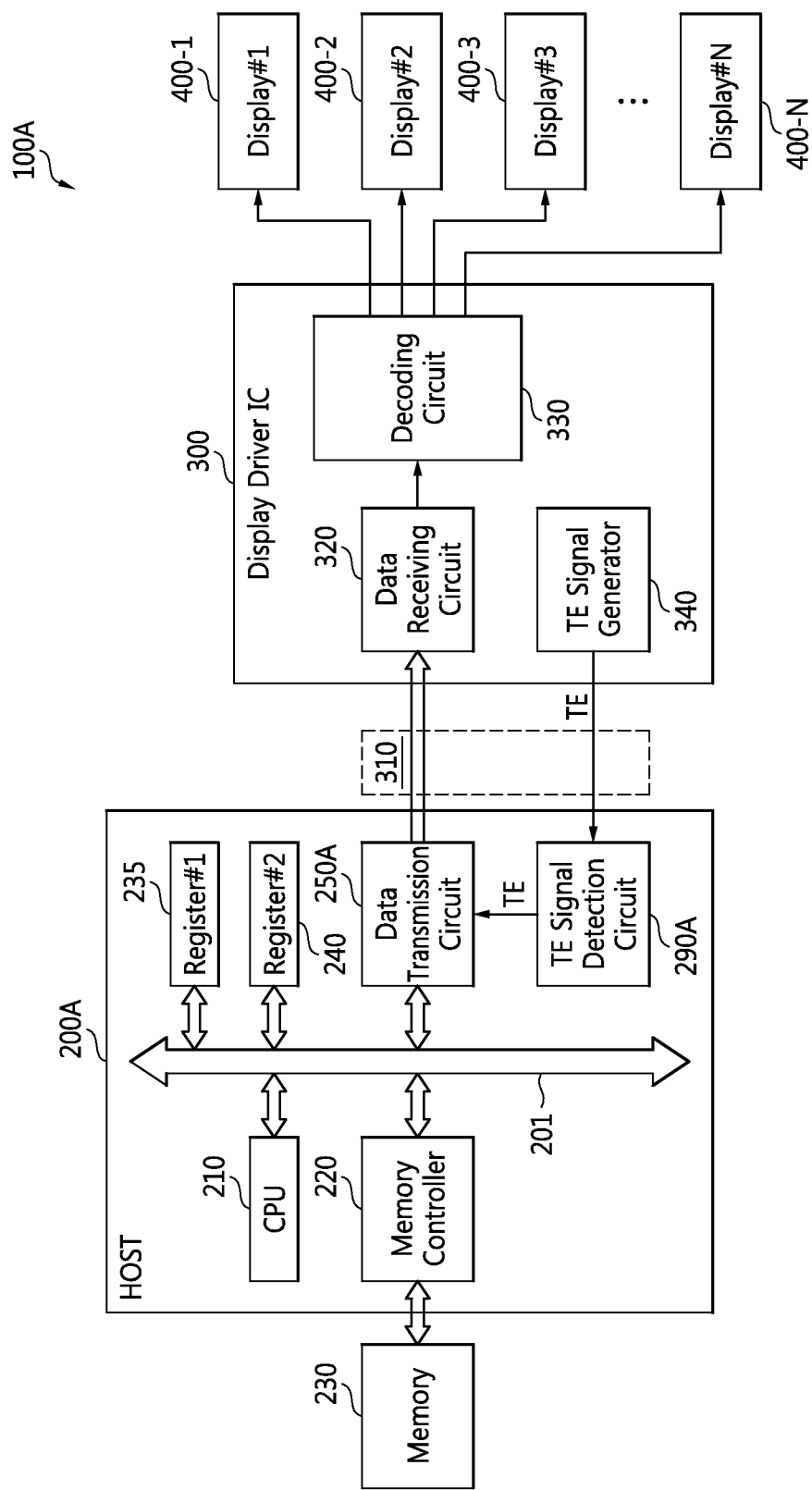
FIG. 1 is a block diagram of a multi-display system according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a multi-display system 100A according to some embodiments of the inventive concept. Referring to FIG. 1, the multi-display system 100A includes a host 200A, a memory 230, an interface 310, a display driver integrated circuit (IC) 300, and a plurality of displays 400-1 through 400-N, where N is a natural number of at least 2.

The multi-display system 100A may be a display system including a plurality of the displays 400-1 through 400-N. for example, the multi-display system 100A may be implemented as a television (TV) system, a multi-screen system, or a portable electronic device. The portable electronic device may be a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The host 200A may sequentially transmit data packets to the display driver IC 300, which controls the operations of the displays 400-1 through 400-N, through the interface 310. The host 200A may be implemented as an IC, a system on chip (SoC), an application processor (AP), a mobile AP, or a processor that can control the operations of the display driver IC 300.

The host 200A may include a central processing unit (CPU) 210, a memory controller 220, a first register 235, a second register 240, a data transmission circuit (or a data processing circuit) 250A, and a tearing effect (TE) signal detection circuit 290A. In the embodiments illustrated in FIGS. 3A and 3B, the host 200A may include only the first register 235 without the second register 240.

The CPU 210 may control the operations of the memory controller 220, the first register 235, the second register 240, the data transmission circuit 250A, and the TE signal detection circuit 290A through a bus 201.

After the host 200A is booted, the CPU 210 may set first values in the first register 235 to adjust a frame rate of each of the displays 400-1 through 400-N. The CPU 210 may also set second values related with the transmission (or selection) of a TE signal in the second register 240 after the host 200A is booted. For example, each of the first and second registers 235 and 240 may be implemented as a special function register (SFR).

The memory controller 220 may read data (e.g., video data or display data) from the memory 230 or write data (e.g., video data or display data) to the memory 230 according to the control of the CPU 210.

The memory 230 may be a volatile or non-volatile memory. The volatile memory may be dynamic random access memory (DRAM) or static RAM (SRAM). The non-volatile memory may be flash-based memory, phase-change RAM (PRAM), magnetic RAM (MRAM), spin-transfer torque MRAM (STT-MRAM), ferroelectric RAM (FeRAM), or resistive RAM (RRAM).

Although one memory controller 220 and one memory 220 are illustrated in FIG. 1, it may be construed that the memory controller 220 includes two or more memory controllers and the memory 230 includes two or more memories. When the memory 230 is a set of DRAM and flash-based memory, the memory controller 220 may be construed as a set of a DRAM controller and a flash memory controller.

Although the memory 230 is implemented outside the host 200A in the embodiments illustrated in FIG. 1, the memory 230 may be implemented inside the host 200A in other embodiments. The memory 230 may be removable from the host 200A. The memory 230 may be implemented as a multimedia card (MMC), an embedded MMC (eMMC), a universal serial bus (USB) flash drive, a universal flash storage (UFS), or a solid state drive (SSD).

The data transmission circuit 250A may generate a transmission timing-controlled data packet using a TE signal TE output from the TE signal detection circuit 290A, first values in the first register 235, second values in the second register 240, and data read by the memory controller 220.

The data transmission circuit 250A may transmit the data packet, which will be displayed on each of the displays 400-1 through 400-N, to the display driver IC 300 in frame (or frame data) units through the interface 310. Alternatively, the data transmission circuit 250A may transmit the data packet, which will be displayed on each of the displays 400-1 through 400-N, to the display driver IC 300 in line (or line data) units through the interface 310.

The data transmission circuit 250A may generate a data packet including a data identifier for identifying each of the displays 400-1 through 400-N. The data packet, which will be described in detail with reference to FIGS. 9 through 11 later, includes data (or payload) to be displayed on each of the displays 400-1 through 400-N.

The TE signal detection circuit 290A may detect the TE signal TE output from the display driver IC 300. The TE signal detection circuit 290A may be implemented as a TE pin. It may be included in the data transmission circuit 250A in other embodiments. The CPU 210 may monitor the TE signal TE and control the data packet transmission timing of the data transmission circuit 250A according to the monitoring result. The TE signal TE output from the display driver IC 300 may be different from an output signal TE of the TE signal detection circuit 290A, but they are denoted by the same reference character for clarity of the description.

The TE signal TE indicates a display status in a non-display period, i.e., a vertical banking interval between frames. During the non-display period, the TE signal TE transits to a high level. Accordingly, the data transmission circuit 250A may transmit a data packet to the display driver IC 300 through the interface 310 while the TE signal TE is at the high level to avoid tearing. In other words, the data transmission circuit 250A may control the transmission timing of a data packet to be transmitted to one of the displays 400-1 through 400-N in response to the TE signal TE at the high level or according to the control of the CPU 210.

The interface 310 may be connected between the host 200A and the display driver IC 300. The interface 310 may function as a physical channel. The interface 310 may be a high-speed serial interface (HSSI). The interface 310 may be implemented as a mobile industry processor interface (MIPI®) display serial interface (DSI), an embedded DisplayPort (eDP) interface, or a high definition multimedia interface (HDMI). When the interface 310 is a MIPI DSI, a physical transmission channel may include a single clock lane and a maximum of four data lanes.

Figure 15:
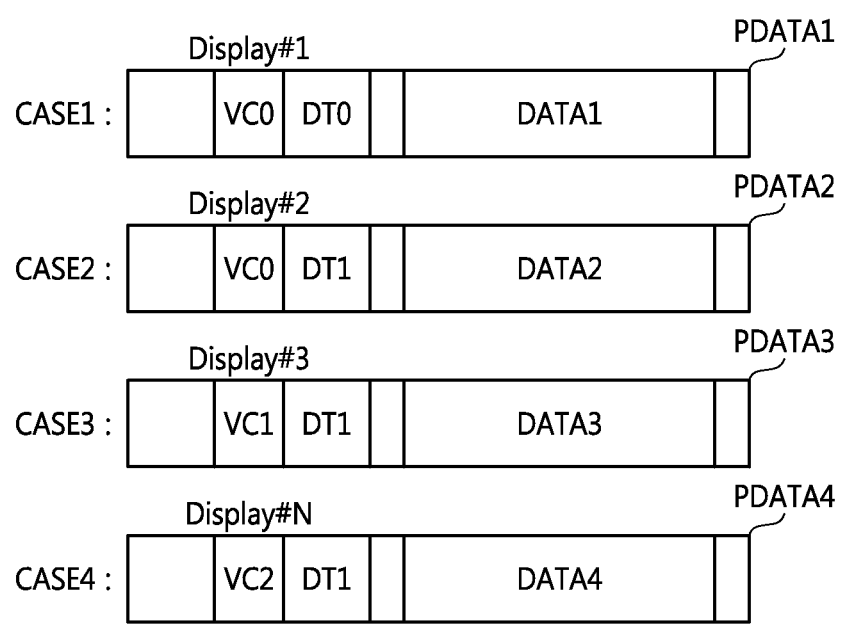
FIG. 15 is a conceptual diagram for explaining an operation of identifying a display using a data identifier byte according to some embodiments of the inventive concept.

The display driver IC 300 may receive a data packet through the interface 310, decode the data packet (and more particularly, a data identifier (ID) included in a packet header), and transmit the data packet to a display selected from among the displays 400-1 through 400-N according to the decoding result. As shown in FIG. 15, data to be displayed on one of the displays 400-1 through 400-N may be identified based on a data ID included in a data packet.

The display driver IC 300 may include a data receiving circuit 320, a decoding circuit 330, and a TE signal generator 340. The data receiving circuit 320 receives a data packet through the interface 310 and transmits the data packet to the decoding circuit 330.

The decoding circuit 330 may decode the data packet (and more particularly, a data ID included in a packet header) received from the data receiving circuit 320 and may transmit the data packet to a display identified according to the decoding result from among the displays 400-1 through 400-N. The data receiving circuit 320 may be a MIPI D-PHY and the decoding circuit 330 may be a MIPI DSI slave controller.

Figure 4:
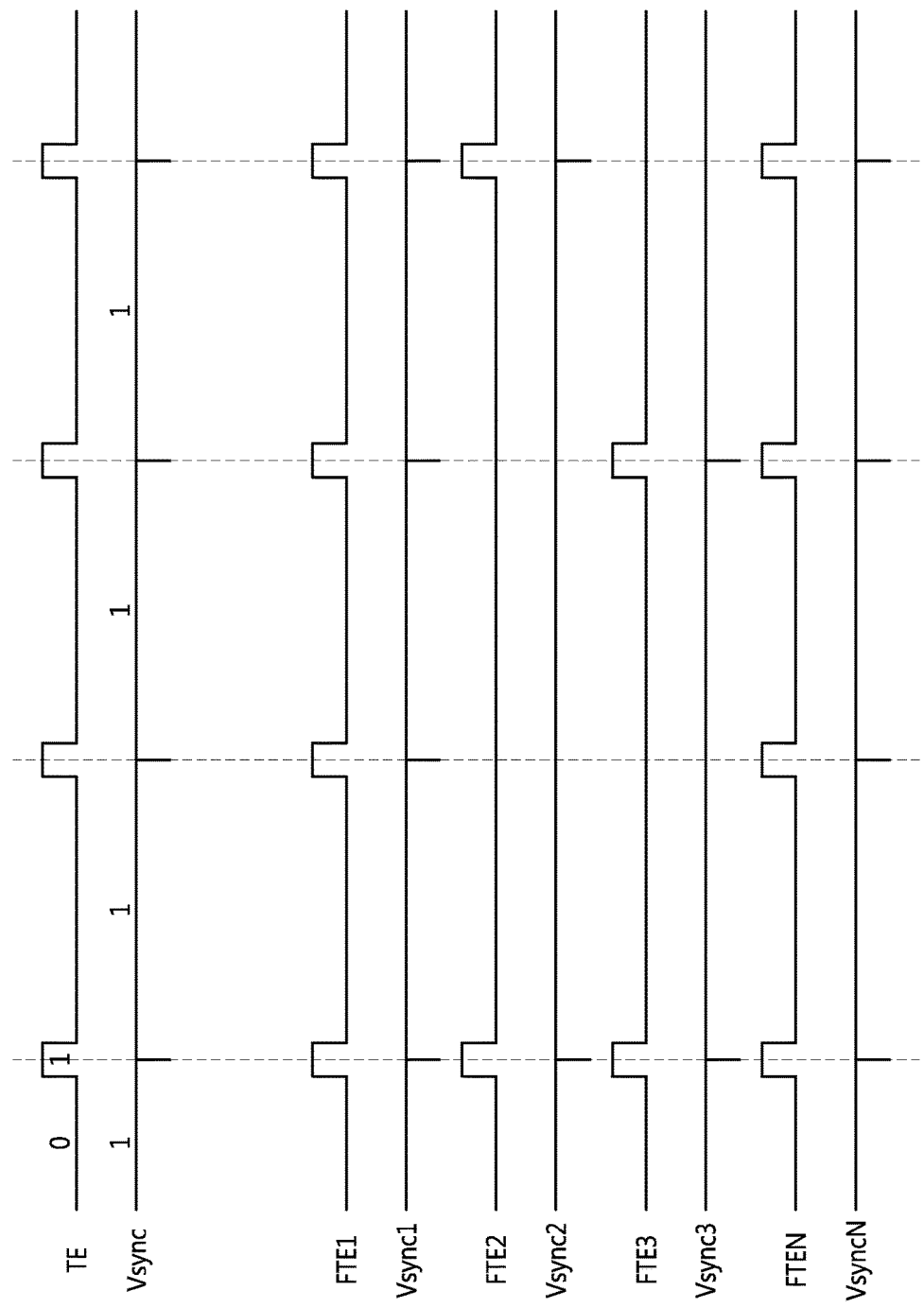
FIG. 4 is a timing chart illustrating waveforms of frame rate adjustment signals shown in FIG. 2B or 3B.

The TE signal generator 340 generates a TE signal TE and transmits the TE signal TE to the host 200A through the interface 310. For example, as shown in FIG. 4, when a vertical synchronous signal related with data to be displayed on the displays 400-1 through 400-N is at a low level, the TE signal TE is at the high level.

Figure 11:
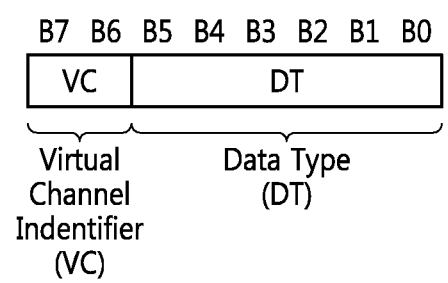
FIG. 11 is a diagram illustrating a data identifier byte in the long packet structure shown in FIG. 9 or the short packet structure shown in FIG. 10.

Each of the displays 400-1 through 400-N identified by a data ID included in a data packet displays data output from the display driver IC 300. The data ID may include a virtual channel ID and a data type, as shown in FIG. 11. The displays 400-1 through 400-N may have the same resolution or different resolutions. The displays 400-1 through 400-N may include the same number of lines or different numbers of lines.

Figure 2A:
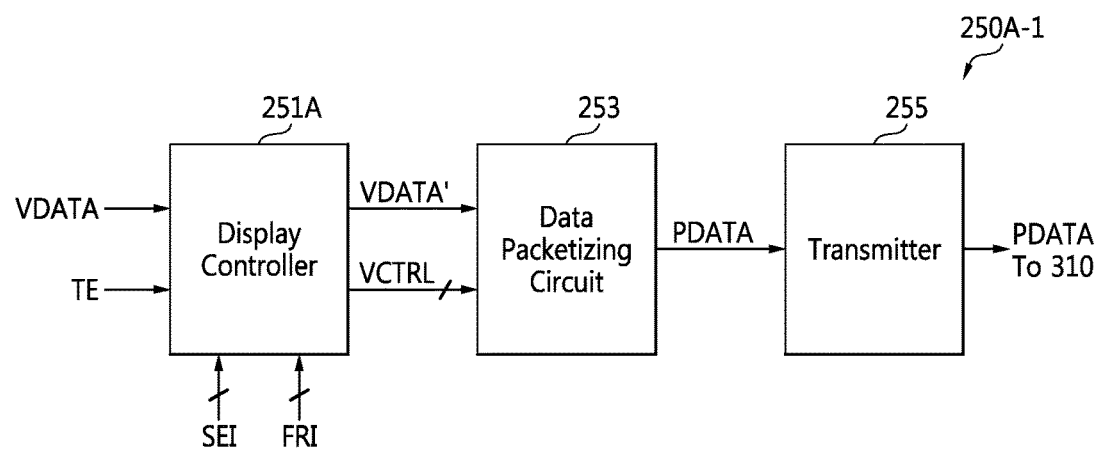
FIG. 2A is a block diagram of an example of a data transmission circuit illustrated in FIG. 1.

FIG. 2A is a block diagram of an example 250A-1 of the data transmission circuit 250A illustrated in FIG. 1. The data transmission circuit 250A-1 illustrated in FIG. 2A may include a display controller 251A, a data packetizing circuit 253, and a transmitter 255.

Figure 2B:
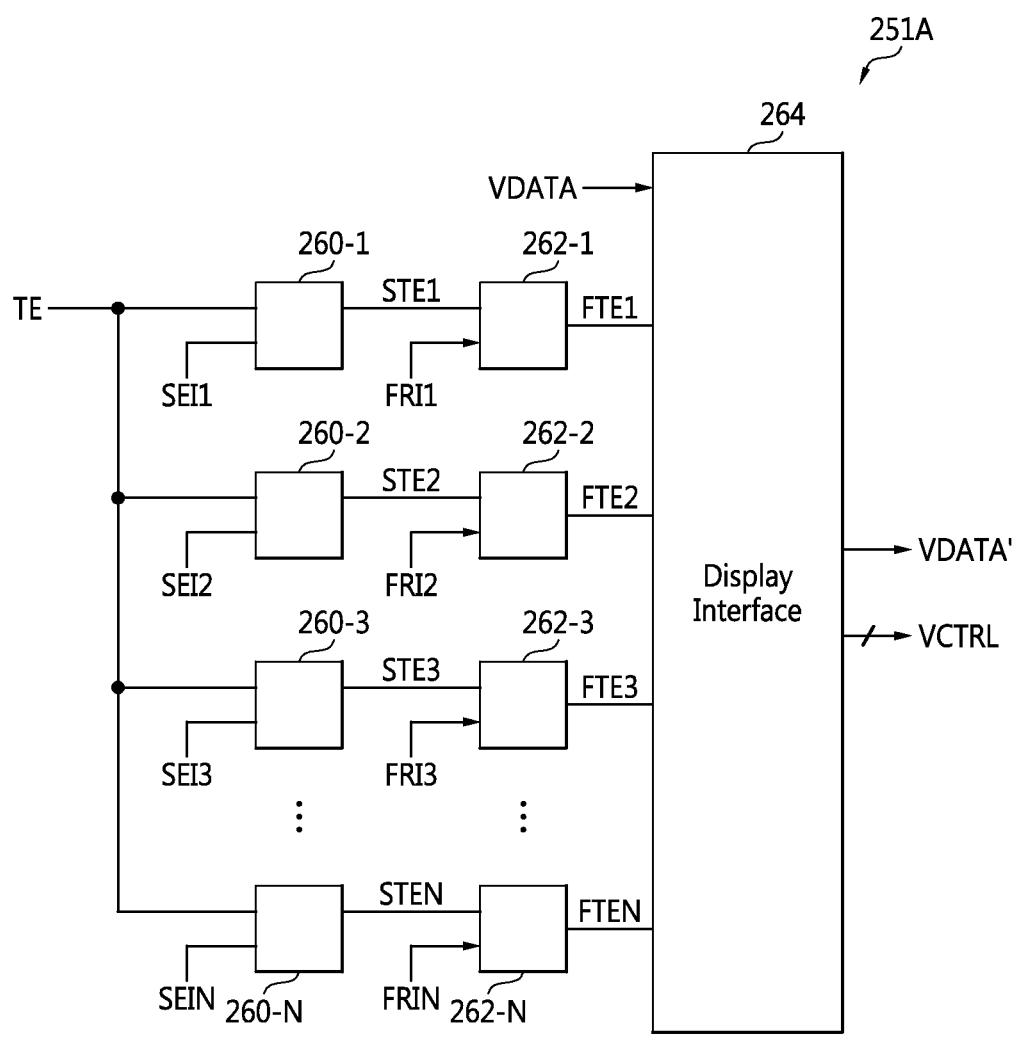
FIG. 2B is a circuit diagram of a display controller illustrated in FIG. 2A.

FIG. 2B is a circuit diagram of the display controller 251A illustrated in FIG. 2A. Referring to FIGS. 2A and 2B, the display controller 251A includes a plurality of transmission control circuits 260-1 through 260-N (where N is a natural number of at least 2), a plurality of frame rate adjustment signal generation circuits 262-1 through 262-N, and a display interface 264. For example, the display controller 251A may function as a graphics controller.

The transmission control circuits 260-1 through 260-N may control the transmission of the TE signal TE in response to second values SEI1 through SEIN (collectively denoted by "SEI"), respectively. Each of the transmission control circuits 260-1 through 260-N may be implemented as an AND gate and may function as a masking circuit.

When the second values SEI1 through SEIN are at a high level (or have data "1"), the transmission control circuits 260-1 through 260-N may output the TE signal TE as output signals STE1 through STEN, respectively. However, when the second values SEI1 through SEIN are at a low level (or have data "0"), the transmission control circuits 260-1 through 260-N may output signals at a low level as the output signals STE1 through STEN, respectively. The second values SEI1 through SEIN may be stored in the second register 240 by the CPU 210.

Each of the frame rate adjustment signal generation circuits 262-1 through 262-N may adjust a period of each of the output signals STE1 through STEN of the transmission control circuits 260-1 through 260-N in response to each of first values FRI1 through FRIN and may output each of frame rate adjustment signals FTE1 through FTEN with an adjusted period. The waveforms of the frame rate adjustment signals FTE1 through FTEN are illustrated in FIG. 4. Each of the frame rate adjustment signals FTE1 through FTEN may adjust a frame rate of each of the displays 400-1 through 400-N.

The display interface 264 may adjust a transmission timing of each data VDATA to be displayed on each of displays 400-1 through 400-N in response to each of frame rate adjustment signals FTE1 through FTEN and may generate transmission timing-controlled data VDATA' and control signals VCTRL. For example, the control signals VCTRL may include a clock signal and synchronous signals related with the transmission of the data VDATA'. The synchronous signals may include a vertical synchronous signal and a horizontal synchronous signal.

The data VDATA to be displayed on the displays 400-1 through 400-N may be data output from the memory 230 by the memory controller 220. The data VDATA may be stored in memory included in the display interface 264 in other embodiments. The memory may be implemented as frame memory, graphics memory, or first-in first-out (FIFO).

Figure 9:
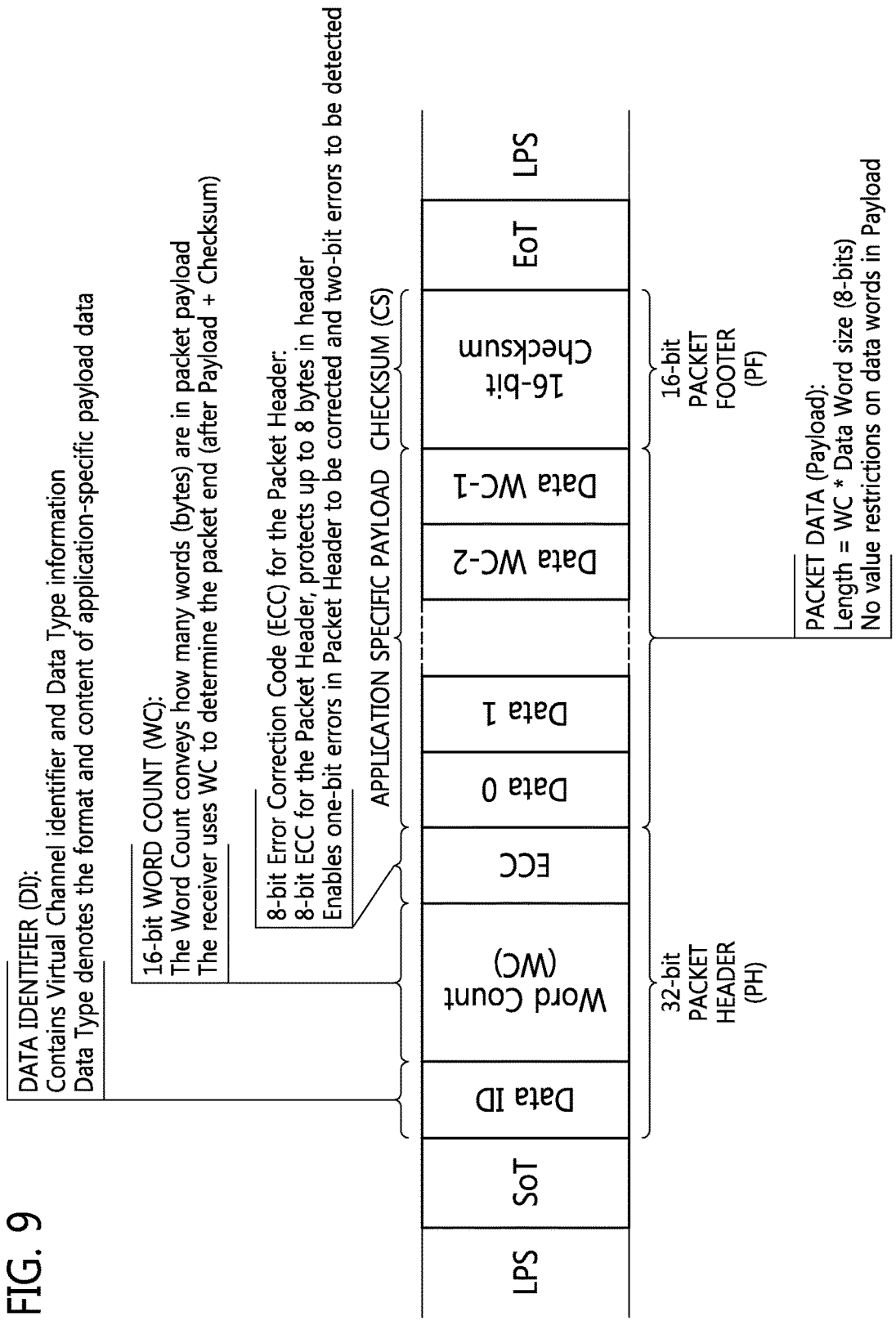
FIG. 9 is a diagram of a long packet structure.
Figure 10:
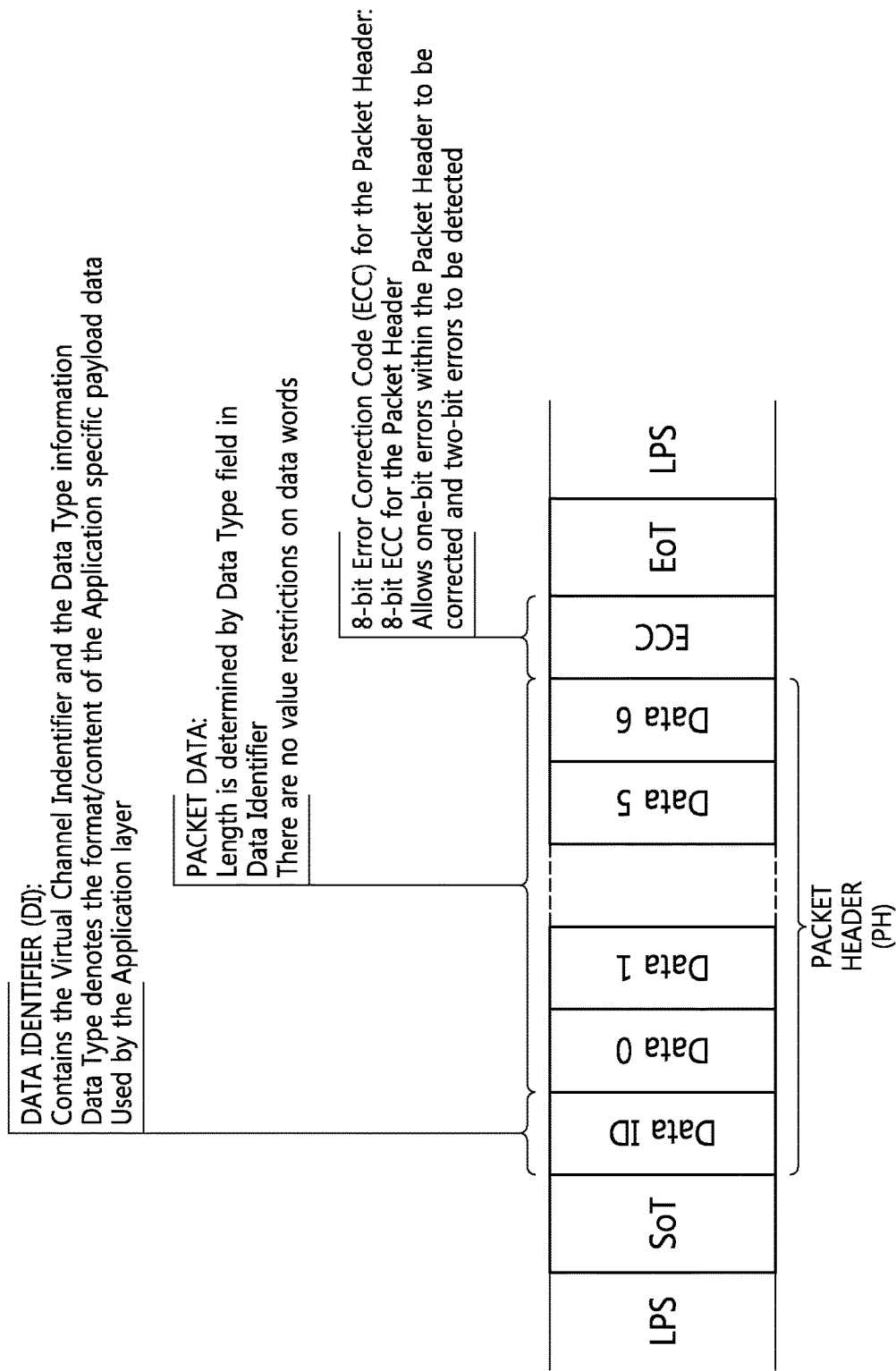
FIG. 10 is a diagram of a short packet structure.

The data packetizing circuit 253 may packetize the transmission timing-controlled data VDATA' received from the display controller 251A and may output a data packet PDATA to the transmitter 255. Examples of the data packet PDATA are illustrated in FIGS. 9 and 10.

The transmitter 255 may transmit the data packet PDATA to the display driver IC 300 through the interface 310. The data packetizing circuit 253 may be a MIPI® DSI host controller and the transmitter 255 may be a MIPI D-PHY.

Figure 3A:
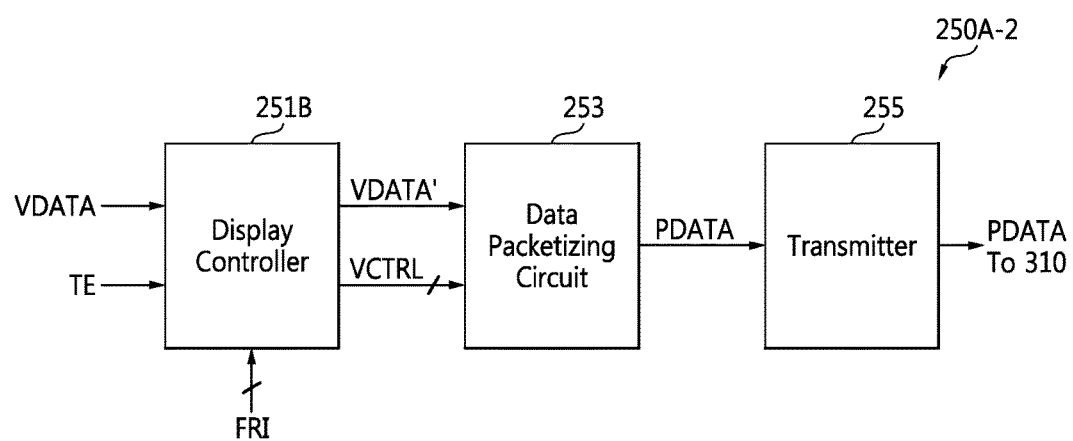
FIG. 3A is a block diagram of another example of the data transmission circuit illustrated in FIG. 1.

FIG. 3A is a block diagram of another example 250A-2 of the data transmission circuit 250A illustrated in FIG. 1. The data transmission circuit 250A-2 illustrated in FIG. 3A may include a display controller 251B, data packetizing circuit 253, and a transmitter 255.

Figure 3B:
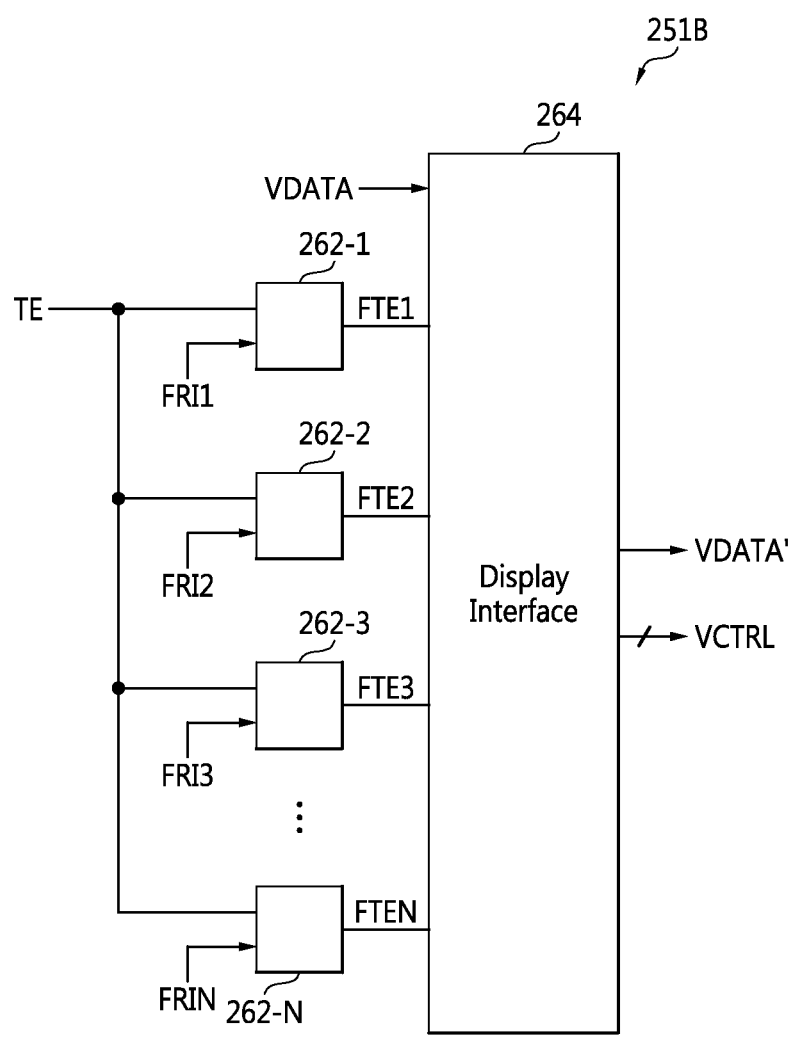
FIG. 3B is a circuit diagram of a display controller illustrated in FIG. 3A.

FIG. 3B is a circuit diagram of the display controller 251B illustrated in FIG. 3A. Referring to FIGS. 3A and 3B, the display controller 251B includes frame rate adjustment signal generation circuits 262-1 through 262-N and a display interface 264. The display controller 251B may function as a graphics controller.

The frame rate adjustment signal generation circuits 262-1 through 262-N may adjust a period of the TE signal TE in response to the first values FRI1 through FRIN, respectively, and may respectively output the frame rate adjustment signals FTE1 through FTEN with an adjusted period. The waveforms of the frame rate adjustment signals FTE1 through FTEN are illustrated in FIG. 4. For example, when the first value FRI1 is zero, the frame rate adjustment signal generation circuit 262-1 may be turned off.

When the first values FRI1 through FRIN are signals with a predetermined width, each of the frame rate adjustment signal generation circuits 262-1 through 262-N may be implemented as an AND gate. At this time, each of the frame rate adjustment signal generation circuits 262-1 through 262-N may be implemented as a period adjustment circuit which can adjust the period of the TE signal TE or a masking circuit.

FIG. 4 is a timing chart illustrating waveforms of the frame rate adjustment signals FTE1 through FTEN shown in FIG. 2B or 3B. Referring to FIGS. 1 through 4, when a vertical synchronous signal Vsync related with the display of data goes low, the TE signal TE goes high. The output signals FTE1 through FTEN of the frame rate adjustment signal generation circuits 262-1 through 262-N are illustrated in FIG. 4 as an example.

The frame rate of corresponding data may be 60 fps (frame per second) according to the frame rate adjustment signal FTE1 and a vertical synchronous signal Vsync1. The frame rate of corresponding data may be 20 fps according to the frame rate adjustment signal FTE2 and a vertical synchronous signal Vsync2. The frame rate of corresponding data may be 30 fps according to the frame rate adjustment signal FTE3 and a vertical synchronous signal Vsync3. The frame rate of corresponding data may be 60 fps according to the frame rate adjustment signal FTEN and a vertical synchronous signal VsyncN.

Figure 5:
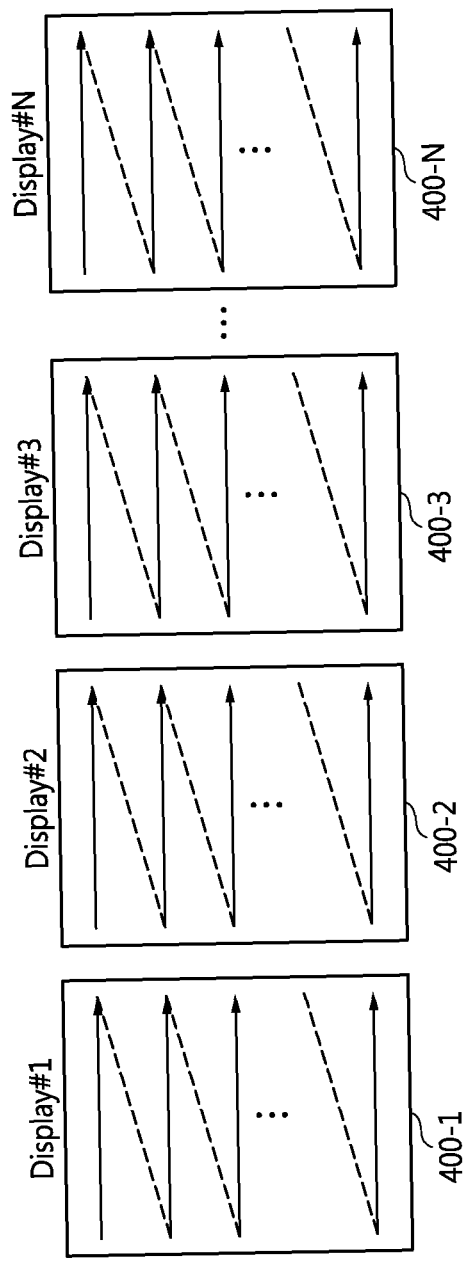
FIG. 5 is a conceptual diagram for explaining a frame data transmission method used by the display controller illustrated in FIG. 2A or 3A.

FIG. 5 is a conceptual diagram for explaining a frame data transmission method used by the display controller 251A or 251B illustrated in FIG. 2A or 3A. In the method illustrated in FIG. 5, frame data to be displayed on the displays 400-1 through 400-N are sequentially transmitted to the display driver IC 300 through the interface 310. When the frame data to be displayed on the displays 400-1 through 400-N have different frame rates, the number of transmissions of frame data to the display driver IC 300 is different among the displays 400-1 through 400-N.

Figure 6:
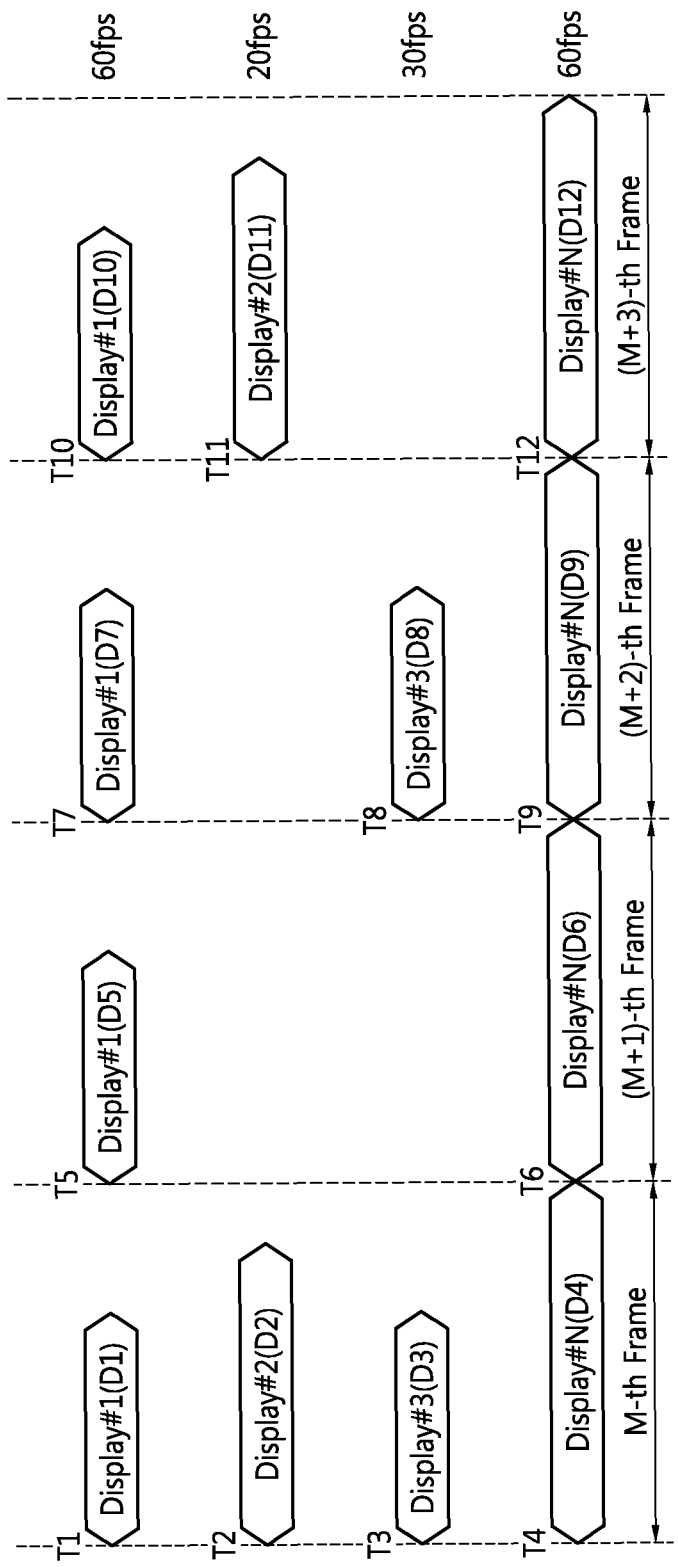
FIG. 6 is a conceptual diagram of data displayed on displays according to the frame data transmission method illustrated in FIG. 5.

FIG. 6 is a conceptual diagram of data displayed on displays according to the frame data transmission method illustrated in FIG. 5. For clarity of the description, it is assumed that the number of the displays 400-1 through 400-N is 4, the first display 400-1 has a frame rate of 60 pfs, the second display 400-2 has a frame rate of 20 pfs, the third display 400-3 has a frame rate of 30 pfs, and the fourth display 400-N (where N is 4) has a frame rate of 60 pfs.

Referring to FIGS. 1 through 6, at a first time point T1, the host 200A transmits a data packet including M-th frame data D1 to be displayed on the first display 400-1 to the display driver IC 300 through the interface 310. The display driver IC 300 decodes a data ID included in the data packet and transmits the M-th frame data D1 included in the data packet to the first display 400-1 according to the decoding result.

At a second time point T2 (where T2>T1), the host 200A transmits a data packet including M-th frame data D2 to be displayed on the second display 400-2 to the display driver IC 300 through the interface 310. The display driver IC 300 decodes a data ID included in the data packet and transmits the M-th frame data D2 included in the data packet to the second display 400-2 according to the decoding result.

At a third time point T3 (where T3>T2), the host 200A transmits a data packet including M-th frame data D3 to be displayed on the third display 400-3 to the display driver IC 300 through the interface 310. The display driver IC 300 decodes a data ID included in the data packet and transmits the M-th frame data D3 included in the data packet to the third display 400-3 according to the decoding result.

At a fourth time point T4 (where T4>T3), the host 200A transmits a data packet including M-th frame data D4 to be displayed on the fourth display 400-4 to the display driver IC 300 through the interface 310. The display driver IC 300 decodes a data ID included in the data packet and transmits the M-th frame data D4 included in the data packet to the fourth display 400-4 according to the decoding result.

At a fifth time point T5 (where T5>T4), the host 200A transmits a data packet including (M+1)-th frame data D5 to be displayed on the first display 400-1 to the display driver IC 300 through the interface 310. The display driver IC 300 decodes a data ID included in the data packet and transmits the (M+1)-th frame data D5 included in the data packet to the first display 400-1 according to the decoding result.

Since the frame rate of the second display 400-2 is 20 pfs and the frame rate of the third display 400-3 is 30 pfs, the host 200A dose not transmit a data packet including (M+1)-th frame data to be displayed on the second display 400-2 and a data packet including (M+1)-th frame data to be displayed on the third display 400-3 to the display driver IC 300. When the display driver IC 300 can control the second and third displays 400-2 and 400-3 to perform a panel self-refresh (PSR), the second display 400-2 may display the M-th frame data D2 stored in a memory included in the display driver IC 300 and the third display 400-3 may display the M-th frame data D3 stored in the memory.

At a sixth time point T6 (where T6>T5), the host 200A transmits a data packet including (M+1)-th frame data D6 to be displayed on the fourth display 400-4 to the display driver IC 300 through the interface 310. The display driver IC 300 decodes a data ID included in the data packet and transmits the (M+1)-th frame data D6 included in the data packet to the fourth display 400-4 according to the decoding result.

At a seventh time point T7 (where T7>T6), the host 200A transmits a data packet including (M+2)-th frame data D7 to be displayed on the first display 400-1 to the display driver IC 300 through the interface 310. The display driver IC 300 decodes a data ID included in the data packet and transmits the (M+2)-th frame data D7 included in the data packet to the first display 400-1 according to the decoding result.

Since the frame rate of the second display 400-2 is 20 pfs, the host 200A does not transmit a data packet including (M+2)-th frame data to be displayed on the second display 400-2 to the display driver IC 300. When the display driver IC 300 can control the second display 400-2 to perform a PSR, the second display 400-2 may display the M-th frame data D2 stored in the memory included in the display driver IC 300.

At an eighth time point T8 (where T8>T7), the host 200A transmits a data packet including (M+2)-th frame data D8 to be displayed on the third display 400-3 to the display driver IC 300 through the interface 310. The display driver IC 300 decodes a data ID included in the data packet and transmits the (M+2)-th frame data D8 included in the data packet to the third display 400-3 according to the decoding result.

At a ninth time point T9 (where T9>T8), the host 200A transmits a data packet including (M+2)-th frame data D9 to be displayed on the fourth display 400-4 to the display driver IC 300 through the interface 310. The display driver IC 300 decodes a data ID included in the data packet and transmits the (M+2)-th frame data D9 included in the data packet to the fourth display 400-4 according to the decoding result.

At a tenth time point T10 (where T10>T9), the host 200A transmits a data packet including (M+3)-th frame data D10 to be displayed on the first display 400-1 to the display driver IC 300 through the interface 310. The display driver IC 300 decodes a data ID included in the data packet and transmits the (M+3)-th frame data D10 included in the data packet to the first display 400-1 according to the decoding result.

At an eleventh time point T11 (where T11>T10), the host 200A transmits a data packet including (M+3)-th frame data D11 to be displayed on the second display 400-2 to the display driver IC 300 through the interface 310. The display driver IC 300 decodes a data ID included in the data packet and transmits the (M+3)-th frame data D11 included in the data packet to the second display 400-2 according to the decoding result.

Since the frame rate of the third display 400-3 is 30 pfs, the host 200A does not transmit a data packet including (M+3)-th frame data to be displayed on the third display 400-3 to the display driver IC 300. When the display driver IC 300 can control the third display 400-3 to perform a PSR, the third display 400-3 may display the (M+2)-th frame data D8 stored in the memory included in the display driver IC 300.

At a twelfth time point T12 (where T12>T11), the host 200A transmits a data packet including (M+3)-th frame data D12 to be displayed on the fourth display 400-4 to the display driver IC 300 through the interface 310. The display driver IC 300 decodes a data ID included in the data packet and transmits the (M+3)-th frame data D12 included in the data packet to the fourth display 400-4 according to the decoding result.

Figure 7:
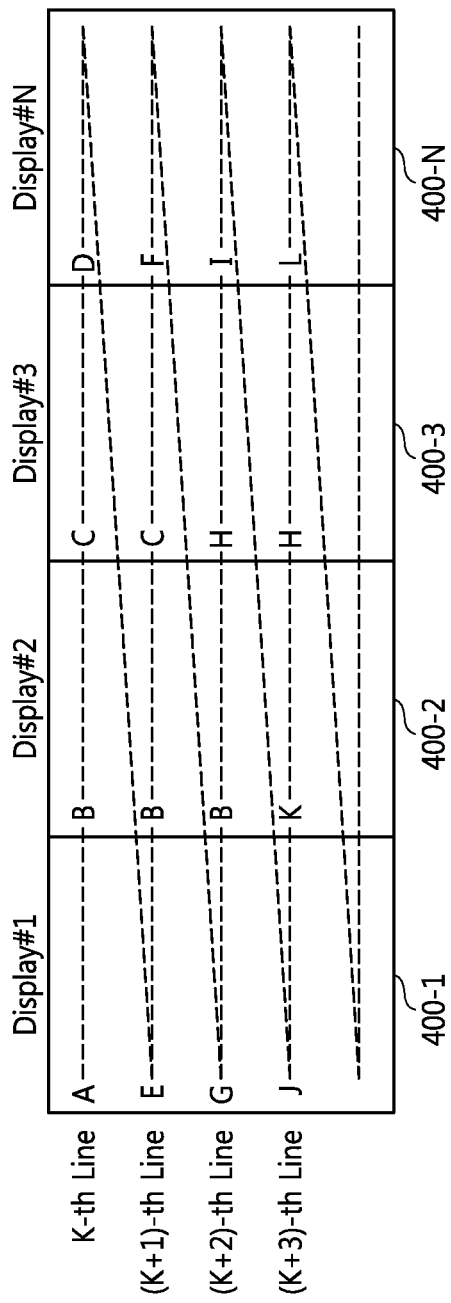
FIG. 7 is a conceptual diagram for explaining a line data transmission method used by the display controller shown in FIG. 2A or 3A.

FIG. 7 is a conceptual diagram for explaining a line data transmission method used by the display controller 251A or 251B shown in FIG. 2A or 3A. In the method illustrated in FIG. 7, line data to be displayed on the displays 400-1 through 400-N are sequentially transmitted to the display driver IC 300 through the interface 310. When the displays 400-1 through 400-N have different numbers of lines, the number of transmissions of line data to the display driver IC 300 is different among the displays 400-1 through 400-N.

Figure 8:
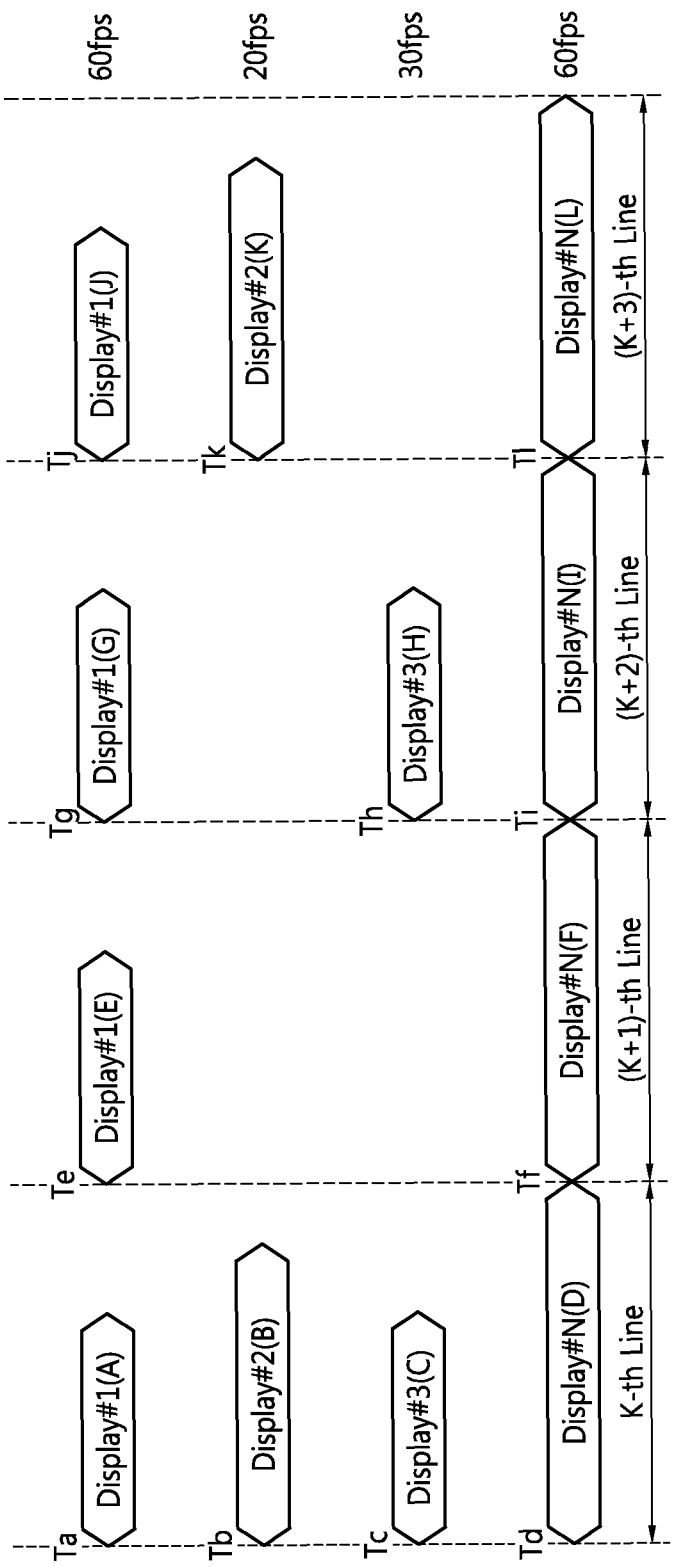
FIG. 8 is a conceptual diagram of data displayed on a display according to the line data transmission method illustrated in FIG. 7.

FIG. 8 is a conceptual diagram of data displayed on displays according to the line data transmission method illustrated in FIG. 7. For clarity of the description, it is assumed that the number of the displays 400-1 through 400-N is 4, the first display 400-1 has a frame rate of 60 pfs, the second display 400-2 has a frame rate of 20 pfs, the third display 400-3 has a frame rate of 30 pfs, and the fourth display 400-N (where N is 4) has a frame rate of 60 pfs.

Referring to FIGS. 1 through 8, at a time point Ta, the host 200A transmits a data packet including K-th line data A to be displayed on the first display 400-1 to the display driver IC 300 through the interface 310. The display driver IC 300 decodes a data ID included in the data packet and transmits the K-th line data A included in the data packet to the first display 400-1 according to the decoding result.

At a time point Tb (where Tb>Ta), the host 200A transmits a data packet including K-th line data B to be displayed on the second display 400-2 to the display driver IC 300 through the interface 310. The display driver IC 300 decodes a data ID included in the data packet and transmits the K-th frame data B included in the data packet to the second display 400-2 according to the decoding result.

At a time point Tc (where Tc>Tb), the host 200A transmits a data packet including K-th frame data C to be displayed on the third display 400-3 to the display driver IC 300 through the interface 310. The display driver IC 300 decodes a data ID included in the data packet and transmits the K-th frame data C included in the data packet to the third display 400-3 according to the decoding result.

At a time point Td (where Td>Tc), the host 200A transmits a data packet including K-th frame data D to be displayed on the fourth display 400-4 to the display driver IC 300 through the interface 310. The display driver IC 300 decodes a data ID included in the data packet and transmits the K-th frame data D included in the data packet to the fourth display 400-4 according to the decoding result.

At a time point Te (where Te>Td), the host 200A transmits a data packet including (K+1)-th line data E to be displayed on the first display 400-1 to the display driver IC 300 through the interface 310. The display driver IC 300 decodes a data ID included in the data packet and transmits the (K+1)-th line data E included in the data packet to the first display 400-1 according to the decoding result.

Since the frame rate of the second display 400-2 is 20 pfs and the frame rate of the third display 400-3 is 30 pfs, the host 200A does not transmit a data packet including (K+1)-th line data to be displayed on the second display 400-2 and a data packet including (K+1)-th line data to be displayed on the third display 400-3 to the display driver IC 300. When the display driver IC 300 can control the second and third displays 400-2 and 400-3 to perform a PSR, the second display 400-2 may display the K-th frame data B stored in a memory included in the display driver IC 300 and the third display 400-3 may display the K-th frame data C stored in the memory.

At a time point Tf (where Tf>Te), the host 200A transmits a data packet including (K+1)-th frame data F to be displayed on the fourth display 400-4 to the display driver IC 300 through the interface 310. The display driver IC 300 decodes a data ID included in the data packet and transmits the (K+1)-th line data F included in the data packet to the fourth display 400-4 according to the decoding result.

A procedure for displaying line data G, H, I, J, K, and L on the displays 400-1 through 400-N at time points Tg, Th, Ti, Tj, Tk, and Tl, respectively, is substantially the same as or similar to the procedure for displaying the line data A, B, C, D, E, and F on the displays 400-1 through 400-N at the time points Ta, Tb, Tc, Td, Te, and Tf, respectively. Thus, detailed descriptions thereof will be omitted.

FIG. 9 is a diagram of a long packet structure. FIG. 10 is a diagram of a short packet structure. FIG. 11 is a diagram illustrating a data ID byte in the long packet structure shown in FIG. 9 or the short packet structure shown in FIG. 10. The structures illustrated in FIGS. 9 through 11 are substantially the same as the content disclosed in Specification for DSI Version 1.2 issued by MIPI Alliance on Jun. 16, 2014, and herein incorporated by reference in its entirety. Thus, the disclosure of DSI version 1.2 will be referred to for the structures illustrated in FIGS. 9 through 11.

A data ID included in a packet header PH of a data packet includes a virtual channel ID VC and a data type DT. The data transmission circuit 250A of the host 200A may generate the data packet PDATA including a data ID for identifying one of the displays 400-1 through 400-N. Therefore, the decoding circuit 330 of the display driver IC 300 may decode the data ID included in the data packet PDATA and may transmit data (e.g., frame data or line data) included in the data packet PDATA to one of the displays 400-1 through 400-N, which is identified by the decoding result.

Figure 12:
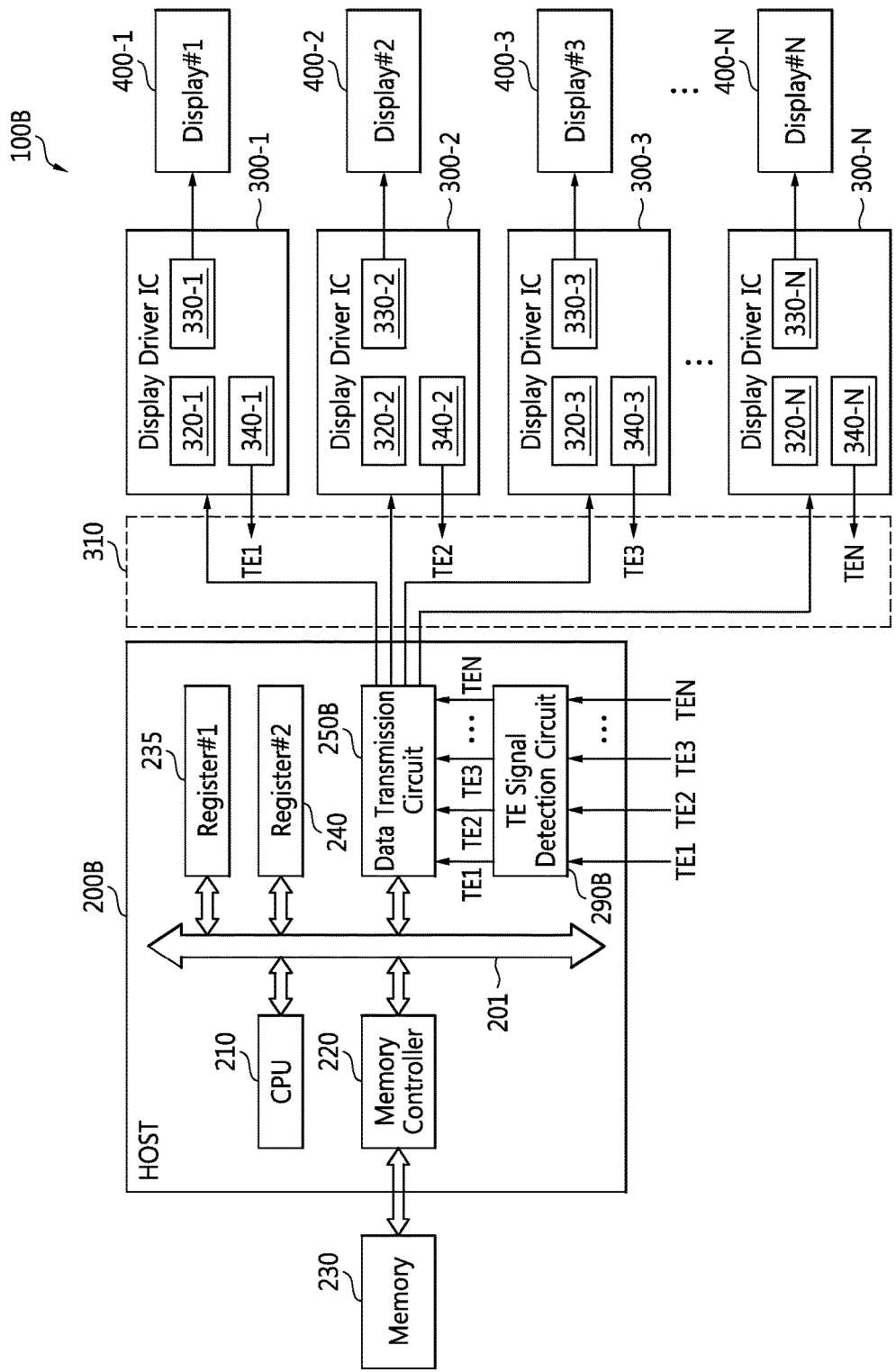
FIG. 12 is a block diagram of a multi-display system according to other embodiments of the inventive concept.

FIG. 12 is a block diagram of a multi-display system 100B according to other embodiments of the inventive concept. Referring to FIG. 12, the multi-display system 100B includes a host 200B, a memory 230, an interface 310, a plurality of display driver ICs 300-1 through 300-N, and a plurality of the displays 400-1 through 400-N, where N is a natural number of at least 2.

The host 200B may include a CPU 210, a memory controller 220, a first register 235, a second register 240, a data transmission circuit (or a data processing circuit) 250B, and a TE signal detection circuit 290B.

The TE signal detection circuit 290B may detect TE signals TE1 through TEN respectively output from the display driver ICs 300-1 through 300-N. In other embodiments, the TE signal detection circuit 290B may be formed with TE pins and may be included in the data transmission circuit 250B. In some embodiments, the CPU 210 may monitor the TE signals TE1 through TEN and control the data packet transmission timing of the data transmission circuit 250B according to the monitoring result.

The TE signals TE1 through TEN output from the display driver ICs 300-1 through 300-N may be different from output signals TE1 through TEN of the TE signal detection circuit 290B, but they are denoted by the same reference characters for clarity of the description.

The structure and operations of each of the display driver ICs 300-1 through 300-N are substantially the same as or similar to those of the display driver IC 300 illustrated in FIG. 1. The structure and functions of each of data receiving circuits 320-1 through 320-N included in the display driver ICs 300-1 through 300-N, respectively, are substantially the same as or similar to those of the data receiving circuit 320 included in the display driver IC 300 illustrated in FIG. 1.

The structure and functions of each of decoding circuits 330-1 through 330-N included in the display driver ICs 300-1 through 300-N, respectively, are substantially the same as or similar to those of the decoding circuit 330 included in the display driver IC 300 illustrated in FIG. 1. The structure and functions of each of TE signal generators 340-1 through 340-N included in the display driver ICs 300-1 through 300-N, respectively, are substantially the same as or similar to those of the TE signal generator 340 included in the display driver IC 300 illustrated in FIG. 1.

Figure 13:
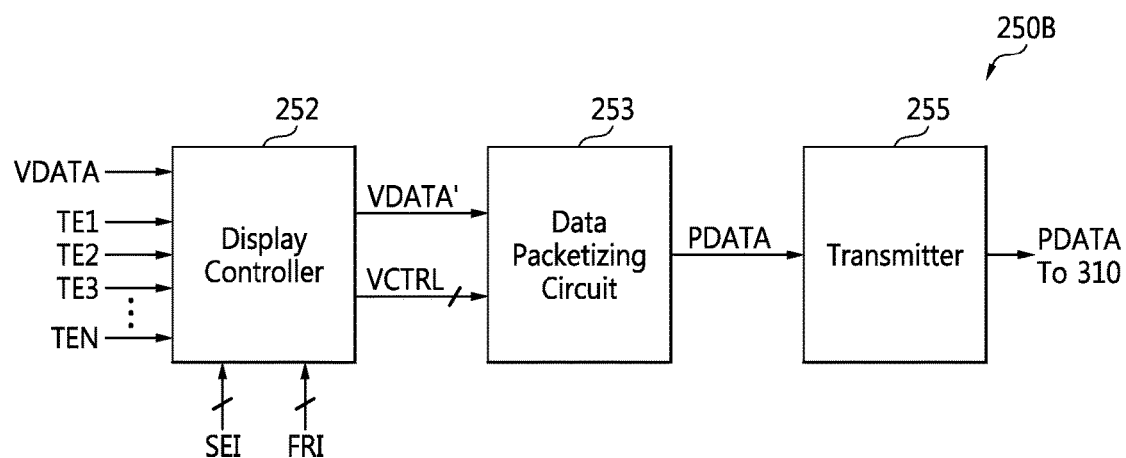
FIG. 13 is a block diagram of a data transmission circuit illustrated in FIG. 12.
Figure 14:
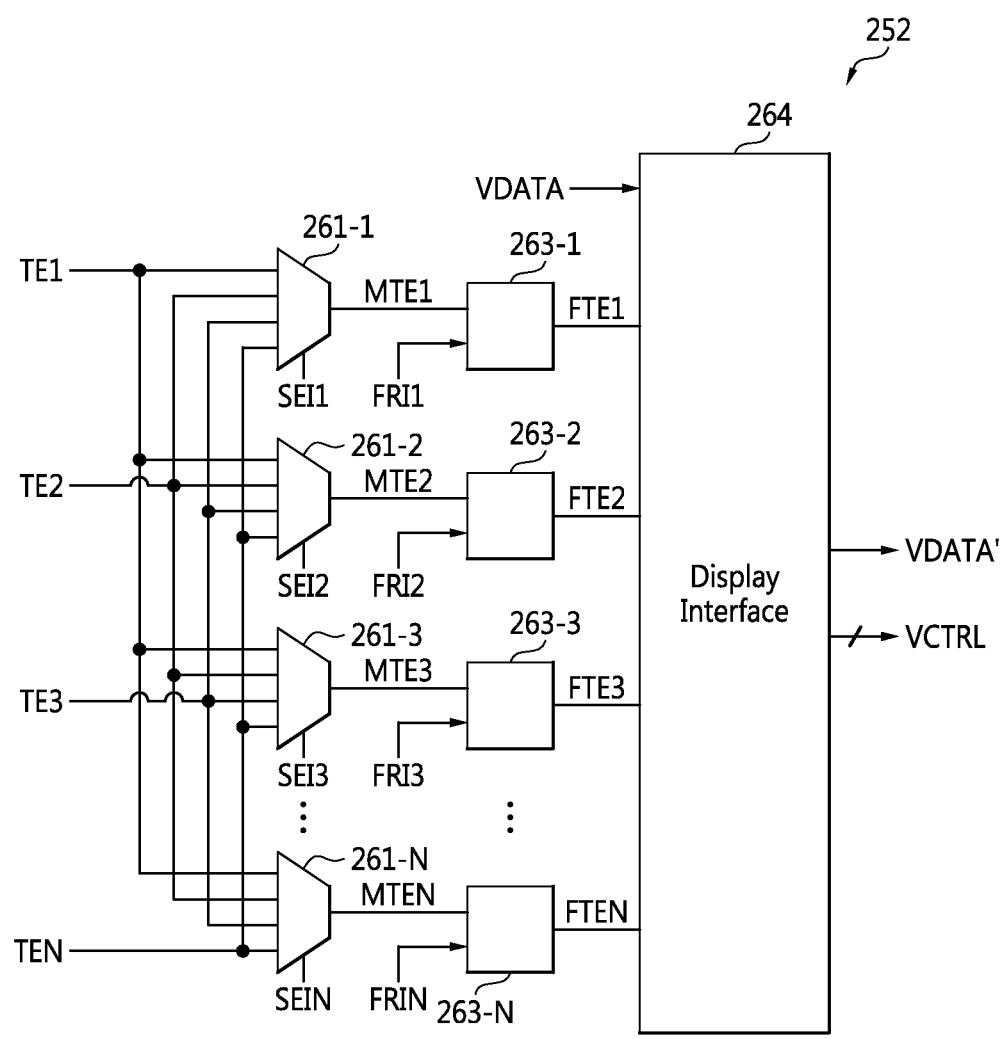
FIG. 14 is a circuit diagram of a display controller illustrated in FIG. 13.

FIG. 13 is a block diagram of the data transmission circuit 250B illustrated in FIG. 12. FIG. 14 is a circuit diagram of a display controller 252 illustrated in FIG. 13. The data transmission circuit 250B may include the display controller 252, the data packetizing circuit 253, and the transmitter 255. The display controller 252 includes a plurality of selection circuits 261-1 through 261-N, a plurality of frame rate adjustment signal generation circuits 263-1 through 263-N, and the display interface 264. The display controller 252 may function as a graphics controller.

The selection circuits 261-1 through 261-N may control the transmission of the TE signals TE1 through TEN in response to the second values SEI1 through SEIN (collectively denoted by "SEI"), respectively. Each of the selection circuits 261-1 through 261-N may be implemented as a multiplexer.

The first selection circuit 261-1 may output one of the TE signals TE1 through TEN as a first output signal MTE1 in response to the second value SEI1. The second selection circuit 261-2 may output one of the TE signals TE1 through TEN as a second output signal MTE2 in response to the second value SEI2. The third selection circuit 261-3 may output one of the TE signals TE1 through TEN as a third output signal MTE3 in response to the second value SEI3. The N-th selection circuit 261-N may output one of the TE signals TE1 through TEN as an N-th output signal MTEN in response to the second value SEIN. Each of the second values SEI1 through SEIN may include a plurality of signals and may be stored in the second register 240 by the CPU 210.

Each of the frame rate adjustment signal generation circuits 263-1 through 263-N may adjust a period of one of the output signals MTE1 through MTEN of the respective selection circuits 261-1 through 261-N in response to one of the first values FRI1 through ERIN and may output one of the frame rate adjustment signals FTE1 through FTEN with an adjusted period. The waveforms of the frame rate adjustment signals FTE1 through FTEN are illustrated in FIG. 4. Each of the frame rate adjustment signals FTE1 through FTEN may adjust a frame rate of each of the displays 400-1 through 400-N.

The display interface 264 may adjust the transmission timing of the data VDATA to be displayed on the displays 400-1 through 400-N in response to the frame rate adjustment signals FTE1 through FTEN and may generate the transmission timing-controlled data VDATA' and the control signals VCTRL. The control signals VCTRL may include a clock signal and synchronous signals related with the transmission of the data VDATA'. The synchronous signals may include a vertical synchronous signal and a horizontal synchronous signal.

FIG. 15 is a conceptual diagram for explaining an operation of identifying a display based on a data ID byte according to some embodiments of the inventive concept. Referring to FIGS. 1 through 15, the data transmission circuits 250A and 250B may generate data packets PDATA1 through PDATA4 which include data IDs, respectively, and data DATA1 through DATA4, respectively. For clarity of the description, it is assumed that a data ID including a virtual channel ID VC0 and a data type DT0 is for identifying the first display 400-1, a data ID including the virtual channel ID VC0 and a data type DT1 is for identifying the second display 400-2, a data ID including a virtual channel ID VC1 and the data type DT1 is for identifying the third display 400-3, and a data ID including a virtual channel ID VC2 and the data type DT1 is for identifying the N-th display 400-N.

The operations of the multi-display system 100A illustrated in FIG. 1 will be described with reference to relevant drawings. In a first case CASE1, when the data transmission circuit 250A of the host 200A generates the data packet PDATA1 including the data ID (including VC0 and DT0) and the data DATA1 and outputs the data packet PDATA1 to the display driver IC 300 through the interface 310, the decoding circuit 330 of the display driver IC 300 decodes the data ID (i.e., VC0 and DT0) included in the data packet PDATA1 received from the data receiving circuit 320 and transmits the data DATA1 included in the data packet PDATA1 to the first display 400-1 according to the decoding result.

In a second case CASE2, when the data transmission circuit 250A of the host 200A generates the data packet PDATA2 including the data ID (including VC0 and DT1) and the data DATA2 and outputs the data packet PDATA2 to the display driver IC 300 through the interface 310, the decoding circuit 330 of the display driver IC 300 decodes the data ID (i.e., VC0 and DT1) included in the data packet PDATA2 received from the data receiving circuit 320 and transmits the data DATA2 included in the data packet PDATA2 to the second display 400-2 according to the decoding result.

In a third case CASE3, when the data transmission circuit 250A of the host 200A generates the data packet PDATA3 including the data ID (including VC1 and DT1) and the data DATA3 and outputs the data packet PDATA3 to the display driver IC 300 through the interface 310, the decoding circuit 330 of the display driver IC 300 decodes the data ID (i.e., VC1 and DT1) included in the data packet PDATA3 received from the data receiving circuit 320 and transmits the data DATA3 included in the data packet PDATA3 to the third display 400-3 according to the decoding result.

In a fourth case CASE4, when the data transmission circuit 250A of the host 200A generates the data packet PDATA4 including the data ID (including VC2 and DT1) and the data DATA4 and outputs the data packet PDATA4 to the display driver IC 300 through the interface 310, the decoding circuit 330 of the display driver IC 300 decodes the data ID (i.e., VC2 and DT1) included in the data packet PDATA4 received from the data receiving circuit 320 and transmits the data DATA4 included in the data packet PDATA4 to the N-th display 400-N according to the decoding result.

The operations of the multi-display system 100B illustrated in FIG. 12 will be described with reference to relevant drawings. In the first case CASE1, when the data transmission circuit 250B of the host 200B generates the data packet PDATA1 including the data ID (including VC0 and DT0) and the data DATA1 and outputs the data packet PDATA1 to the display driver ICs 300-1 through 300-N through the interface 310, only the decoding circuit 330-1 of the first display driver IC 300-1 may decode the data ID (i.e., VC0 and DT0) included in the data packet PDATA1 received from the data receiving circuit 320-1 and transmit the data DATA1 included in the data packet PDATA1 to the first display 400-1 according to the decoding result.

In the second case CASE2, when the data transmission circuit 250B of the host 200B generates the data packet PDATA2 including the data ID (including VC0 and DT1) and the data DATA2 and outputs the data packet PDATA2 to the display driver ICs 300-1 through 300-N through the interface 310, only the decoding circuit 330-2 of the second display driver IC 300-2 may decode the data ID (i.e., VC0 and DT1) included in the data packet PDATA2 received from the data receiving circuit 320-2 and transmit the data DATA2 included in the data packet PDATA2 to the second display 400-2 according to the decoding result.

In the third case CASE3, when the data transmission circuit 250B of the host 200B generates the data packet PDATA3 including the data ID (including VC1 and DT1) and the data DATA3 and outputs the data packet PDATA3 to the display driver ICs 300-1 through 300-N through the interface 310, only the decoding circuit 330-3 of the third display driver IC 300-3 may decode the data ID (i.e., VC1 and DT1) included in the data packet PDATA3 received from the data receiving circuit 320-3 and transmit the data DATA3 included in the data packet PDATA3 to the third display 400-3 according to the decoding result.

In the fourth case CASE4, when the data transmission circuit 250B of the host 200B generates the data packet PDATA4 including the data ID (including VC2 and DT1) and the data DATA4 and outputs the data packet PDATA4 to the display driver ICs 300-1 through 300-N through the interface 310, only the decoding circuit 330-N of the N-th display driver IC 300-N may decode the data ID (i.e., VC2 and DT1) included in the data packet PDATA4 received from the data receiving circuit 320-N and transmit the data DATA4 included in the data packet PDATA4 to the N-th display 400-N according to the decoding result.

As described above, the decoding circuits 330 and 330-1 through 330-N respectively included in the display driver ICs 300 and 300-1 through 300-N can uniquely identify the displays 400-1 through 400-N using the virtual channel ID VC and the data type DT included in a data ID included in each of the data packets PDATA1 through PDATA4.

Figure 16:
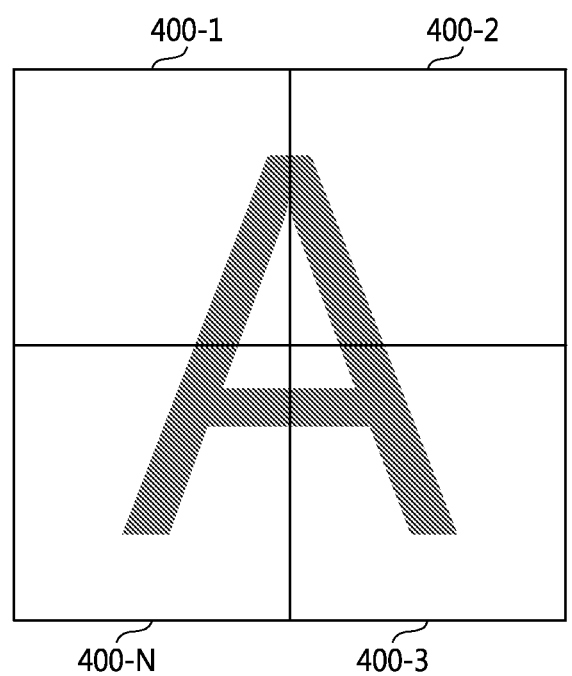
FIGS. 16 through 18 are diagrams of examples of data displayed on a plurality of displays.
Figure 17:
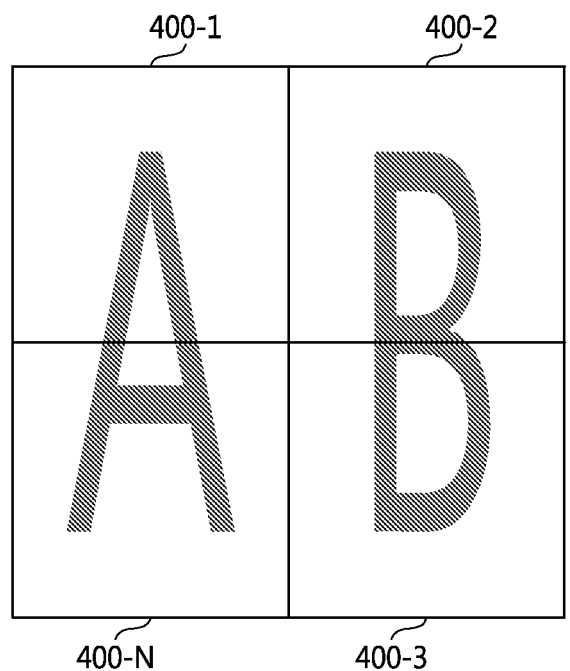
Figure 18:
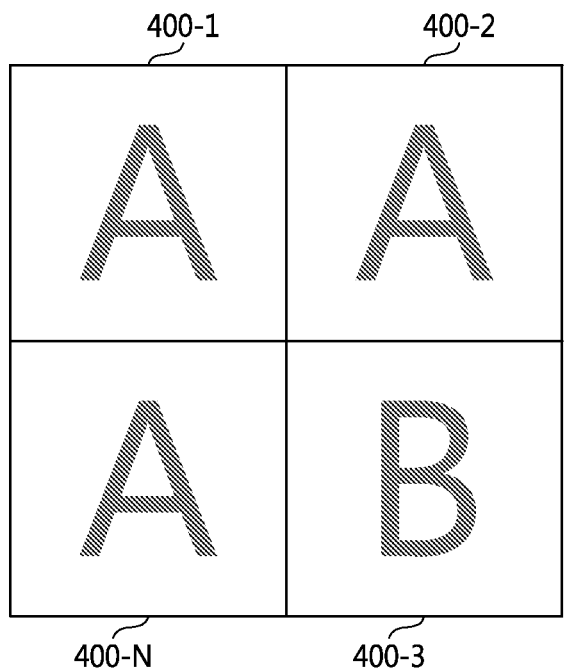

FIGS. 16 through 18 are diagrams of examples of data displayed on a plurality of the displays 400-1 through 400-N. Referring to FIG. 16, when the number of the displays 400-1 through 400-N is four (4), a single image (e.g., A) may be displayed across four displays 400-1 through 400-4. Referring to FIG. 17, when the number of the displays 400-1 through 400-N is four, a first image (e.g., A) may be displayed across two displays 400-1 and 400-N and a second image (e.g., B) may be displayed across two remaining displays 400-2 and 400-3. Referring to FIG. 18, when the number of the displays 400-1 through 400-N is four, a first image (e.g., A) may be displayed on three displays 400-1, 400-2, and 400-N and a second image (e.g., B) may be displayed on one remaining display 400-3.

Figure 19:
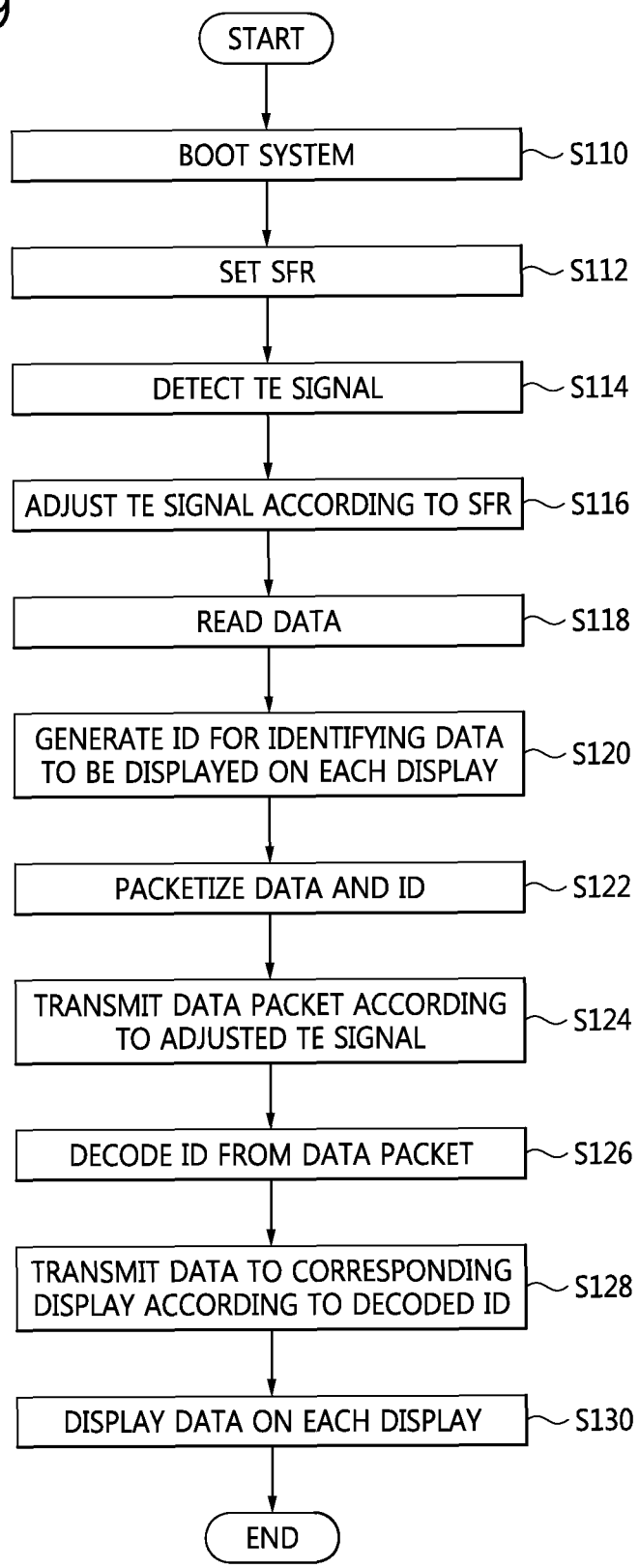
FIG. 19 is a flowchart of a method of operating the multi-display system illustrated in FIG. 1 or 12 according to some embodiments of the inventive concept.

FIG. 19 is a flowchart of a method of operating the multi-display system 100A or 100B illustrated in FIG. 1 or 12 according to some embodiments of the inventive concept. Referring to FIGS. 1 through 19, when the multi-display system 100A or 100B is booted in operation S110, the CPU 210 may set the first values FRI in the first register 235 in operation S112. Alternatively, the CPU 210 may also set the second values SEI in the second register 240 in operation S112.

In the method of operating the multi-display system 100A, the TE signal detection circuit 290A receives the TE signal TE from the display driver IC 300 and detects the TE signal TE in operation S114. The data transmission circuit 250A adjusts the TE signal TE using the TE signal TE and the first values FRI in operation S116. In other words, the data transmission circuit 250A generates the frame rate adjustment signals FTE1 through FTEN. The memory controller 220 reads data (e.g., video data or display data) from the memory 230 and transmits the data to the data transmission circuit 250A according to the control of the CPU 210 in operation S118.

The data transmission circuit 250A generates an ID for identifying data to be displayed on each of the displays 400-1 through 400-N according to the control of the CPU 210 in operation S120. As shown in FIGS. 9 through 11, the ID may include the virtual channel ID VC and the data type DT. The data transmission circuit 250A packetizes data to be displayed on each of the displays 400-1 through 400-N and the ID for identifying the each of the displays 400-1 through 400-N to generate data packets in operation S122. The data transmission circuit 250A transmits the data packets to the display driver IC 300 through the interface 310 using the adjusted TE signals TE, i.e., the frame rate adjustment signals FTE1 through FTEN in operation S124.

The data receiving circuit 320 of the display driver IC 300 transmits the data packets to the decoding circuit 330. The decoding circuit 330 decodes the data ID included in each of the data packets in operation S126. The decoding circuit 330 transmits data included in a data packet corresponding to the decoded data ID to a display selected or identified by the data ID from among the displays 400-1 through 400-N in operation S128. The display selected from among the displays 400-1 through 400-N displays the data in operation S130.

In the method of operating the multi-display system 100B, the TE signal detection circuit 290B receives the TE signals TE1 through TEN from the display driver ICs 300-1 through 300-N and detects the TE signals TE1 through TEN in operation S114. The data transmission circuit 250B adjusts the TE signals TE1 through TEN using the TE signals TE1 through TEN, the first values FRI, and the second values SEI in operation S116. In other words, the data transmission circuit 250B generates the frame rate adjustment signals FTE1 through FTEN.

The memory controller 220 reads data (e.g., video data or display data) from the memory 230 and transmits the data to the data transmission circuit 250B according to the control of the CPU 210 in operation S118.

The data transmission circuit 250B generates an ID for identifying data to be displayed on each of the displays 400-1 through 400-N according to the control of the CPU 210 in operation S120. As shown in FIGS. 9 through 11, the ID may include the virtual channel ID VC and the data type DT. The data transmission circuit 250B packetizes data to be displayed on each of the displays 400-1 through 400-N and the ID for identifying the each of the displays 400-1 through 400-N to generate data packets in operation S122. The data transmission circuit 250B transmits the data packets to the display driver ICs 300-1 through 300-N through the interface 310 using the adjusted TE signals TE, i.e., the frame rate adjustment signals FTE1 through FTEN in operation S124.

The data receiving circuits 320-1 through 32-N of the respective display driver ICs 300-1 through 300-N transmit the data packets to the decoding circuits 330-1 through 330-N, respectively. Each of the decoding circuits 330-1 through 330-N decodes the data ID included in a received data packet in operation S126. Each of the decoding circuits 330-1 through 330-N transmits data included in the data packet to a corresponding one of the displays 400-1 through 400-N in operation S128. The corresponding display among the displays 400-1 through 400-N displays the data in operation S130.

Figure 20:
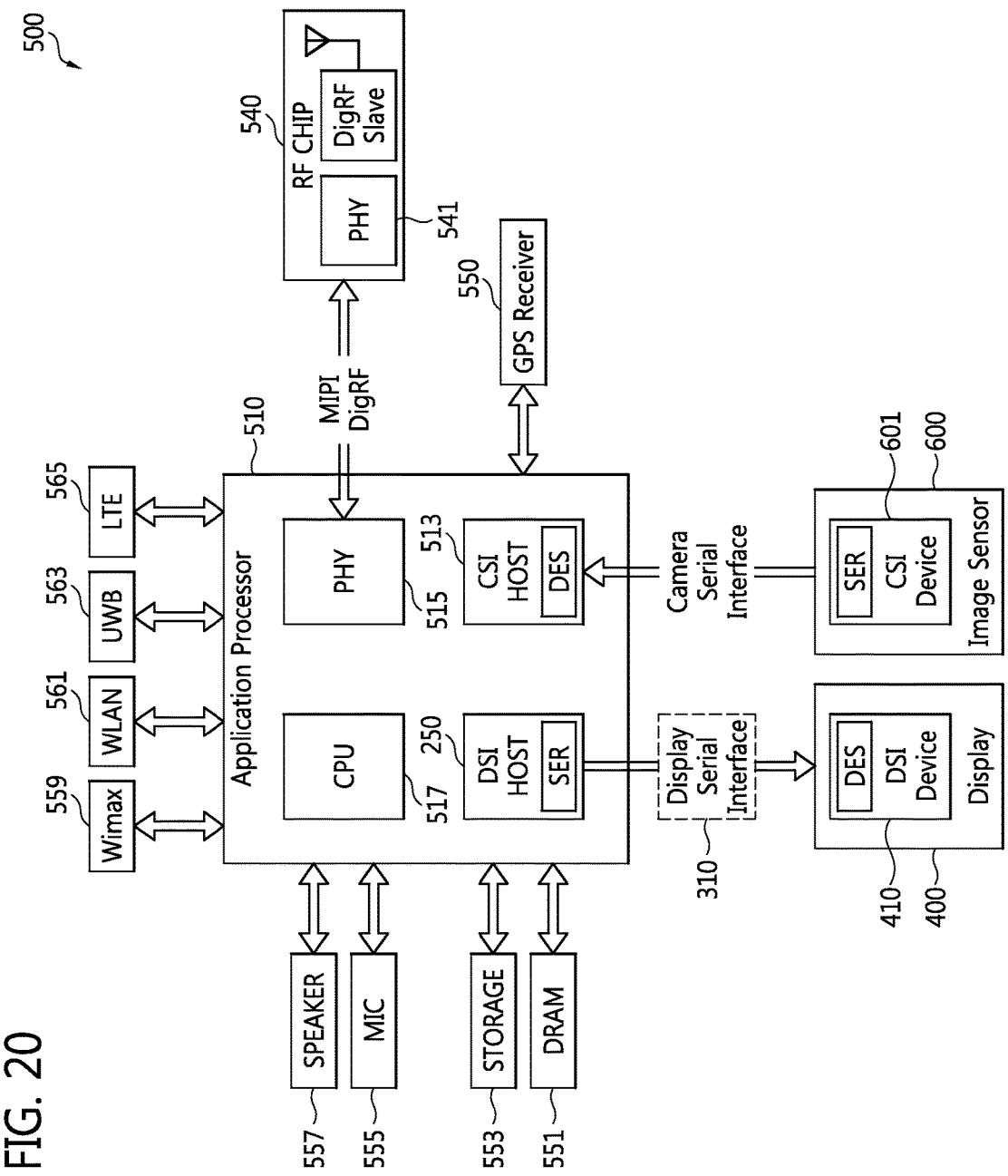
FIG. 20 is a block diagram of a multi-display system according to further embodiments of the inventive concept.

FIG. 20 is a block diagram of a multi-display system 500 according to further embodiments of the inventive concept. Referring to FIGS. 1 through 20, the multi-display system 500 may be implemented as a portable electronic device that can use or support MIPI®. The multi-display system 500 includes an AP 510, a complementary metal oxide semiconductor (CMOS) image sensor 600, and a display 400.

A camera serial interface (CSI) host 513 included in the AP 510 may perform serial communication with a CSI device 601 included in the COMES image sensor 600 through CSI. A deserializer DES and a serializer SER may be included in the CSI host 513 and the CSI device 601, respectively.

A display serial interface (DSI) host 250 included in the AP 510 may perform serial communication with a DSI device 410 included in the display 400 through DSI. A serializer SER and a deserializer DES may be included in the DSI host 250 and the DSI device 410, respectively. The deserializers DES and the serializers SER may process electrical signals or optical signals. The DSI host 250 may be the data transmission circuit 250A or 250B illustrated in FIG. 1 or 12. The DSI device 410 may include the data receiving circuit 320 or the data receiving circuits 320-1 through 320-N and the decoding circuit 330 or the decoding circuits 330-1 through 330-N.

The multi-display system 500 may also include a radio frequency (RF) chip 540 communicating with the AP 510. A physical layer (PHY) 515 included in the AP 510 and a PHY 541 included in the RF chip 540 may communicate data with each other according to MIPI DigRF. A CPU 517 included in the AP 510 may control the operations of the DSI host 250, the CSI host 513, and the PHY 515.

The multi-display system 500 may further include a global positioning system (GPS) receiver 550, a memory 551 such as DRAM, a data storage 553 formed using non-volatile memory such as NAND flash memory, a microphone (MIC) 555, and/or a speaker 557. The data storage 553 may be the memory 230. The multi-display system 500 may communicate with external devices using at least one communication protocol or standard such as worldwide interoperability for microwave access (Wimax) 559, wireless local area network (WLAN) 561, ultra-wideband (UWB) 563, or long term evolution (LTE) 565. The multi-display system 500 may also communicate with external devices using Bluetooth or WiFi.

As described above, according to some embodiments of the inventive concept, a multi-display system including a host generates a data packet including a packet header containing a data ID for identifying one of a plurality of displays. The multi-display system includes a display driver IC that decodes the data ID, identifies a display according to the decoding result, and transmits data included in the data packet to the identified display.

Consequently, the multi-display system including a single physical channel between the host and the display driver IC transmits a data packet, which includes a packet header containing a data ID for identifying one of the displays, from the host to the display driver IC through the single physical channel, thereby reducing power consumption and a hardware layout area.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A system on chip (SoC) for transmitting data packets to a display driver integrated circuit (IC) configured to control a plurality of displays, the system on chip comprising:
a first register;
a central processing unit (CPU) configured to set first values in the first register to adjust a frame rate of each of the displays;
a tearing effect (TE) signal detection circuit configured to detect a TE signal output from the display driver IC and indicating a display status of at least one of the plurality of displays; and
a data transmission circuit configured to generate a plurality of frame rate adjustment signals by adjusting a period of the detected TE signal in response to the first values and to control transmission timings of the data packets transmitted to the displays using the frame rate adjustment signals, respectively.

2. The system on chip of claim 1,
wherein the data transmission circuit is configured to sequentially transmit transmission timing-controlled data packets to the display driver IC through a single high-speed serial interface (HSSI), wherein the HSSI is one of a display serial interface (DSI), an embedded DisplayPort (eDP) interface, and a high definition multimedia interface (HDMI).

3. The system on chip of claim 2,
wherein the data transmission circuit is configured to sequentially transmit the transmission timing-controlled data packets to the display driver IC in frame units.

4. The system on chip of claim 2,
wherein the data transmission circuit is configured to sequentially transmit the transmission timing-controlled data packets to the display driver IC in line units.

5. The system on chip of claim 1,
wherein the data transmission circuit is configured to generate the data packets each of which includes an identifier for identifying one of the displays, and
the identifier includes a virtual channel identifier and a data type.

6. The system on chip of claim 1,
wherein at least one of the first values is 0.

7. The system on chip of claim 1, further comprising:
a second register configured to store second values set by the CPU; wherein the data transmission circuit comprises:
a plurality of transmission control circuits configured to control transmission of the detected TE signal in response to the second values, respectively; and
a plurality of frame rate adjustment signal generation circuits configured to respectively generate the frame rate adjustment signals using output signals of the respective transmission control circuits and the first values, respectively.

8. The system on chip of claim 7, wherein the CPU is configured to set the first values in the first register and the second values in the second register when booted.

9. The system on chip of claim 1, further comprising:
a second register configured to store second values set by the CPU; wherein the data transmission circuit comprises:
a display controller configured to generate the frame rate adjustment signals using the detected TE signal, the first values, and the second values and to adjust transmission timings of data to be displayed on the displays using the frame rate adjustment signals;
a data packetizing circuit configured to generate the data packets, each of which comprises transmission timing-controlled data to be displayed on one of the displays and an identifier for identifying the one of the displays; and
a transmitter configured to sequentially transmit the data packets from the data packetizing circuit to the display driver IC;
wherein the identifier includes a virtual channel identifier and a data type.

10. The system on chip of claim 9, wherein the data packetizing circuit is a mobile industry processor interface (MIPI®) display serial interface (DSI) host, and the transmitter is a MIPI D-PHY.

11. A multi-display system, comprising:
a display driver integrated circuit (IC) configured to control operations of a plurality of displays;
a high-speed serial interface; and
a processor configured to sequentially transmit data packets to the display driver IC through the high-speed serial interface, the processor including:
 a first register,
 a central processing unit (CPU) configured to set first values in the first register to adjust a frame rate of each of the displays,
 a tearing effect (TE) signal detection circuit configured to detect a TE signal output from the display driver IC and indicating a display status of at least one of the plurality of displays, and
 a data transmission circuit configured to generate a plurality of frame rate adjustment signals by adjusting a period of the detected TE signal in response to the first values and to control transmission timings of the data packets transmitted to the displays using the frame rate adjustment signals.

12. The multi-display system of claim 11, wherein the high-speed serial interface is one of a mobile industry processor interface (MIPI®) display serial interface (DSI), an embedded DisplayPort (eDP) interface, and a high definition multimedia interface (HDMI).

13. The multi-display system of claim 11, wherein the processor further comprises a second register configured to store second values set by the CPU; and wherein the data transmission circuit comprises:
a plurality of transmission control circuits configured to control transmission of the detected TE signal in response to the second values, respectively; and
a plurality of frame rate adjustment signal generation circuits configured to respectively generate the frame rate adjustment signals using output signals of the respective transmission control circuits and the first values, respectively.

14. The multi-display system of claim 11, wherein the data transmission circuit is configured to generate the data packets each of which comprises an identifier for identifying one of the displays, and the identifier comprises a virtual channel identifier and a data type.

15. The multi-display system of claim 14, wherein the display driver IC is configured to decode a first identifier included in a first data packet among the data packets received through the high-speed serial interface, identify one of the displays based on a decoding result, and transmit first data included in the first data packet to the identified display.

16. The multi-display system of claim 11, wherein the processor further comprises a second register configured to store second values set by the CPU; wherein the data transmission circuit comprises:
a plurality of transmission control circuits configured to control transmission of the detected TE signal in response to the second values, respectively;
a plurality of frame rate adjustment signal generation circuits configured to respectively generate the frame rate adjustment signals using output signals of the respective transmission control circuits and the first values, respectively; and
a display interface configured to generate the data packets and to control transmission timings of the data packets transmitted to the displays using the frame rate adjustment signals.

17. The multi-display system of claim 16, wherein the display interface is configured to generate the data packets each of which includes data to be displayed on one of the displays and an identifier for identifying the one of the displays and the identifier includes a virtual channel identifier and a data type.

18. The multi-display system of claim 17, wherein the display driver IC is configured to decode the identifier included in each of the data packets, identify one of the displays according to decoding result, and transmit the data to be displayed on the identified display to the identified display.

19. A multi-display system, comprising:
a display driver integrated circuit (IC) configured to control operations of a plurality of displays; and
a processor configured to sequentially transmit data packets to the display driver IC through a high-speed serial interface;
wherein the display driver IC is configured to decode a first identifier included in a first data packet among the data packets received through the high-speed serial interface, identify one of the displays according to decoding result, and transmit first data included in the first data packet to the identified display.

20. The multi-display system of claim 19, wherein the first identifier comprises a virtual channel identifier and a data type.

* * * * *